United States Patent
Hsu

(10) Patent No.: US 7,058,664 B1
(45) Date of Patent: Jun. 6, 2006

(54) METHOD AND SYSTEM FOR DATA RECOVERY

(75) Inventor: Jack Hsu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 319 days.

(21) Appl. No.: 10/134,828

(22) Filed: Apr. 29, 2002

(51) Int. Cl.
*G06F 17/30* (2006.01)

(52) U.S. Cl. .................. 707/200; 707/202; 707/204; 707/201

(58) Field of Classification Search ........ 707/202–204; 711/11–117; 714/114, 15–19
See application file for complete search history.

(56) References Cited

U.S. PATENT DOCUMENTS

| | | | | |
|---|---|---|---|---|
| 4,498,145 | A * | 2/1985 | Baker et al. | 707/202 |
| 5,455,944 | A * | 10/1995 | Haderle et al. | 707/202 |
| 5,488,720 | A * | 1/1996 | Inui | 707/1 |
| 5,499,367 | A * | 3/1996 | Bamford et al. | 707/202 |
| 5,561,795 | A * | 10/1996 | Sarkar | 707/202 |
| 5,729,715 | A * | 3/1998 | Ina et al. | 707/204 |
| 5,907,848 | A * | 5/1999 | Zaiken et al. | 707/202 |
| 5,974,426 | A * | 10/1999 | Lee et al. | 707/202 |
| 6,446,091 | B1 * | 9/2002 | Noren et al. | 707/202 |
| 6,449,623 | B1 * | 9/2002 | Bohannon et al. | 707/202 |
| 6,453,325 | B1 * | 9/2002 | Cabrera et al. | 707/204 |
| 6,615,224 | B1 * | 9/2003 | Davis | 707/202 |
| 6,748,504 | B1 * | 6/2004 | Sawdon et al. | 707/202 |
| 2001/0047347 | A1 * | 11/2001 | Perell et al. | 707/1 |
| 2001/0047360 | A1 * | 11/2001 | Huras et al. | 707/102 |
| 2002/0052872 | A1 * | 5/2002 | Yada | 707/6 |
| 2002/0089543 | A1 * | 7/2002 | Ostergaard et al. | 345/764 |
| 2003/0204430 | A1 * | 10/2003 | Kalmick et al. | 705/8 |

OTHER PUBLICATIONS

Neil J. Rubenking, ZDNet REVIEWS: "Undelete Utilities", http://www.zdnet.com/products/stories/reviews/0,4161,2666756-2,00.html, Published Jan. 10, 2001.

Neil J. Rubenking, ZDNet REVIEWS: "Rescue the Files You Need: Figure 1", http://www.zdnet.com/products/stories/reviews/0,4161,2666930,00.html, Published Jan. 9, 2001.

Neil J. Rubenking, "Rescue the Files You Need Figure 2" http://www.zdnet.com/products/stories/reviews/0,4161,2666931,00.html, Published Jan. 9, 2001.

Neil J. Rubenking, ZDNet REVIEWS: "Rescue the Files You Need Figure 3", http://www.zdnet.com/products/stories/reviews/0,4161,2666933,00.html, Published Jan. 9, 2001.

(Continued)

*Primary Examiner*—Jean M. Corrielus
*Assistant Examiner*—Anh Ly

(57) ABSTRACT

A method and system are provided for performing the recovery of deleted user data in a database datafile. The database datafile may be stored in data storage and may contain one or more flags or "deleted-data flags" indicating that the database datafile contains deleted user data. For recovering the deleted user data, the system receives at least one input indicative of the database datafile, ascertains one or more addresses of deleted user data that have corresponding deleted-data flags, and alters at least one reference in the database datafile that corresponds to the ascertained addresses. Additionally, the system may search the database datafile for the deleted-data flags.

40 Claims, 5 Drawing Sheets

OTHER PUBLICATIONS

Neil J. Rubenking, ZDNet REVIEWS: "Rescue the Files You Need: Figure 4", http://www.zdnet.com/products/stories/reviews/0,4161,2666935,00.html, Published Jan. 4, 2001.

Neil J. Rubenking, Rescue the Files You Need; Wipe Out Those You Don't, http://www.zdnet.com/filters/printerfiendly/0,6061,2666756-3,00.html, Published Jan. 10, 2001.

View NOTEWebIV: View NOTE, "RDBMS Quick Reference Guide", (91 Pages), Jul. 29, 1996.

* cited by examiner

METHOD AND SYSTEM FOR DATA RECOVERY

BACKGROUND OF THE INVENTION

1. Field of the Invention

The present invention relates to databases, and more particularly to a method and system for recovery of deleted records in a database. An exemplary embodiment of the present invention provides for recovering database records inadvertently, purposefully or maliciously deleted from a database. This invention is particularly useful for the recovery of deleted database records when standard backup and recovery mechanism and utilities provide inadequate data recovery because of poor backup-system design, operator error, physical computing platform limitations, and/or disregard of backup and recovery mechanisms provided by database-management systems.

2. Description of Related Art

Many individuals and institutions collect, sort, and analyze data and other valuable information using databases. These databases are created, maintained and interfaced with Database Management Systems or "DBMSs." Such systems generally include a database application ("DBA"), such as Oracle 8i, to provide an interface for a user or operator to enter, edit, sort, modify, analyze or otherwise manipulate collected data. The DBMSs also provide other software applications for managing and maintaining the database. Some of these other software applications or programs provide tools or mechanisms for backing-up and recovering lost or deleted data. These backup and recovery programs, however, may consume tremendous amounts of resources from the computing platforms on which they reside.

Generally, depending on the amount of data or other valuable information to be manipulated, the computing platforms for running the DBMS may vary. Powerful computing platforms may be needed for large amounts of data or manipulations. On the other hand, lesser amounts of data or manipulations may only require simple platforms. Depending on the complexity and the volume of data or manipulations, individuals and institution may desire to balance computing platform cost against computing power. For example, towards the higher end of the power verses cost continuum, a power user's computing platform may include a Sun Enterprise™ 3500 server managed by UNIX operating system that is coupled with several UNIX managed workstations. Conversely, users with less experience and less need for the advanced features of costly applications may only require a personal computer based network or system.

Regardless of the computing platform, however, database users and administrators inadvertently or purposely delete their (and other users) data. When standard backup and recovery mechanisms provided by DBMS are enabled, a user or administrator may easily "undelete" most of the deleted data by using standard utilities provided by the DBMS for such purpose. Despite the potential for loss, however, users or database administrators may fail to invoke the DBMS's mechanisms for data backup and recovery, and thus, the standard utilities become ineffective for recovering deleted data.

When users or administrators fail to invoke these mechanisms (or the mechanisms themselves are corrupt), and the user inadvertently or purposely deletes data, the database application may create inaccessible, deleted records or files. Similarly, after a computing platform or software fault, an equally problematic situation may result because such fault may cause data to appear deleted (or not saved), even though a file containing the data may exist.

By way of example, the Oracle Corporation's family of databases and DBMSs use tools that include standard backup and recovery mechanisms coupled with backup and recovery utilities. One of these tools is Oracle's Enterprise Backup Utility and Recovery Manager. This tool requires that its standard backup and recovery mechanisms be invoked, or the backup and recovery utilities will not work. These standard backup and recovery mechanisms generally require the database application to create log files, which replicate the files that contain the data.

As an illustration, when a user's performs transactions on the user data in an Oracle database, typically, the Oracle DBMS (which includes the Enterprise Backup Utility and Recovery Manager) stores the transactions and related user data in a number of files, namely, datafiles, controlfiles and/or redologs. Each of these files may be used in the recovery of deleted data.

To that end, the datafile is a file that contains the most recent version of the user data. In other words, the datafile contains the user data that reflects the changes from the last committed or performed transaction. So, if the last committed transaction performed included a delete function, then the user data in the datafile will reflect the deletion. Thus, to undo the deletion, the standard backup and recovery utilities typical use other files containing previous versions of the deleted user data to perform a recovery. The datafile, however, may be used by the standard backup and recovery utilities for comparison purposes after locating the deleted user data in another file.

The controlfile is a quasi-database that tracks the status of the transactions in the datafiles and redologs, if any. The controlfile has limited use in the recovery of deleted user data, but may be used by the standard backup and recovery utilities for locating the status of the previously stored datafile.

Redologs are files that track with the datafile and contain previously stored user data, and are the primary file used by the standard backup and recovery utilities for recovery of deleted user data. More specifically, the contents of the redologs track the contents of the datafile, however, the user data contained within the redologs is the data that was in the datafile before a user or administrator "commits" a transaction that changes the information in the database. As can be imagined, the amount of data within redologs can grow quite rapidly. Each redolog, however, is limited in size and continually recycled to prevent from exhausting the resources of the computing platform. Also, more than one redolog may be employed.

These redologs may exist as either an on-line redolog or an archived redolog. Oracle's DBMS provides an archivelog mode that allows the database application to create an archived redolog at some predefined checkpoint, or alternatively, once the on-line redolog fills. After the database application creates the archived redolog, the system may overwrite any information contained in the on-line redolog.

To recover lost information, Oracle's Log Miner recovery utility uses all of the on-line and archived redologs, as well as some of the other stored files. When the archivelog mode is not enabled, the database application will automatically overwrite the on-line redologs. After the database application overwrites the section of the on-line redolog that originally contained the deleted data, access to any of the changes made by the user or administrator is terminated or lost. Consequently, without the archivelog mode active, the Log Miner utility cannot recover the user data once the database application overwrites the on-line redolog because no other on-line or archived redolog contains the deleted data.

Furthermore, the standard backup and recovery utilities' post-deletion recovery may depend on the structure and format of the seemingly intertwined datafiles, controlfile, and redologs. For example, every transaction committed by the user or administrator is tracked by a special parameter termed the System Change Number or "SCN." This number is contained within each of the Oracle datafiles, as well as each controlfile and redolog. Each time a committed transaction occurs, the SCN increments and is stored in the appropriate datafile, controlfile and redolog.

In recovering deleted user data, the backup and recovery utilities routinely use the SCN to locate the proper datafile and its corresponding redolog. Once the standard backup and recovery utilities locate the appropriate datafile and redolog by SCN, the utility "undeletes" the user data by applying a complicated scheme that revises the appropriate datafile with the information contained within the appropriate redolog. If the SCN does not match in any of the appropriate files, then the standard backup and recovery utilities do not "undelete" the deleted data.

In addition, the database application storage buffers further complicate recovery for the standard backup and recovery utilities. For example, each time a user or administrator performs a transaction or set of transactions modifying the user data, the database application writes the transaction data to a dynamic database buffer cache. Upon a checkpoint, or when the buffer cache is full, the database application writes the buffered data to a physical medium. Similarly, the database application writes to the redolog as quickly and efficiency as possible after writing each transaction to the redolog buffer cache. Depending on the database application timing for buffer writes, the redolog may not contain the SCN or the transaction information necessary for "undeleting" the user data, even though the datafile may house the data.

Since un-invoked backup and recovery mechanisms coupled with ineffective standard recovery utilities may prove incapable of recovering the deleted data, individual and institutions may loose significant time, effort, and money by having to re-enter and recreate the deleted data. Even more distressing is the loss of the data entirely, which may result in indeterminate loses above those reflected in having to re-enter and recreate the deleted data. Therefore, what is needed to remedy this unfortunate situation is a method and system for recovering deleted user data in a database for that provides a software application that is independent of any standard backup and recovery utility. And further, this system and method should provide a software application that physically manipulates the database datafiles to recover the deleted data.

SUMMARY OF THE INVENTION

In a first principal aspect, the present invention provides a system for recovery of deleted user data from a database datafile. This system includes at least one processor communicatively coupled to a data-storage, and the database datafile. The database datafile may be stored on the data storage, and may contain one or more flags ("deleted-data flags") that indicate that it contains deleted user data.

To facilitate the recovery of the deleted user data contained within the database datafile, the system also includes program instructions or code executable by the processor to (i) receive at least one input indicative of the database datafile, such as the database datafile's name, for locating the database datafile on the data storage; (ii) ascertain from the database datafile one or more addresses of deleted user data ("deleted-data addresses") that have corresponding deleted-data flags; and (iii) alter one or more references in the database datafile that correspond to the ascertained addresses. When executed by the processor, the code alters one or more references to clear or reset the deleted-data flags, and to produce at least one address corresponding to recovered data. In other words, by clearing or resetting the deleted-data flags, the references re-designate the deleted-data to non-deleted data. This re-designation allows the DBMS or other program to recognize the once deleted user data.

In a second of the principal aspects, the present invention provides functions for carrying out recovery of deleted user data that is contained within a database datafile. The database datafile may contain one or more deleted-data flags for separating the deleted user data form non-deleted user data. To facilitate carrying out the functions, a computing platform comprising a processor and data storage may be used. One of the functions performed is the task of receiving one or more inputs that contain information indicative of the database datafile to locate the database datafile on the data storage. Ideally, the information indicative of the database datafile includes a notation or other indication for locating the deleted user data within the database datafile.

Another function performed is the task of ascertaining one or more addresses of deleted user data, i.e., deleted-data addresses that have corresponding deleted-data flags. Moreover, the functions may include searching the database datafile for one or more of the deleted-data flags, which may aid in ascertaining the deleted-data addresses. Yet another function that may be carried out for the recovery of deleted user data is the task of altering one or more references that correspond to the deleted-data addresses to clear the deleted-data flags, and to produce at least one address corresponding to recovered data. In other words, by clearing or resetting the deleted-data flags, the references re-designate the deleted-data to non-deleted data. This re-designation allows the DBMS or other program to recognize the once deleted user data.

These as well as other aspects and advantages will become apparent to those of ordinary skill in the art by reading the following detailed description with appropriate reference to the accompanying drawings.

BRIEF DESCRIPTION OF THE DRAWINGS

Exemplary embodiments of the invention are described below in conjunction with the appended figures, wherein like reference numerals refer to like elements in the various figures, and wherein.

DETAILED DESCRIPTION

1. Overview

The system for recovering deleted user data and/or other valuable information may be deployed using various exemplary architectures. Included in each of these exemplary architectures is one or more software applications having one or more program instructions (collectively referred to as "code") that may (i) search database files for indications of deleted user data, (ii) locate within the database files one or more addresses of the deleted user data, and/or (iii) physically manipulate the structure of database files to effectively recover previously deleted user data.

Similarly, the method for recovering deleted user data includes (i) searching database files for indications of deleted user data, (ii) locating addresses of the deleted user data within the database files, and/or (iii) physically manipulating the structure of database files to effectively recover previously deleted user data.

2. Exemplary Architecture

Figure 1:
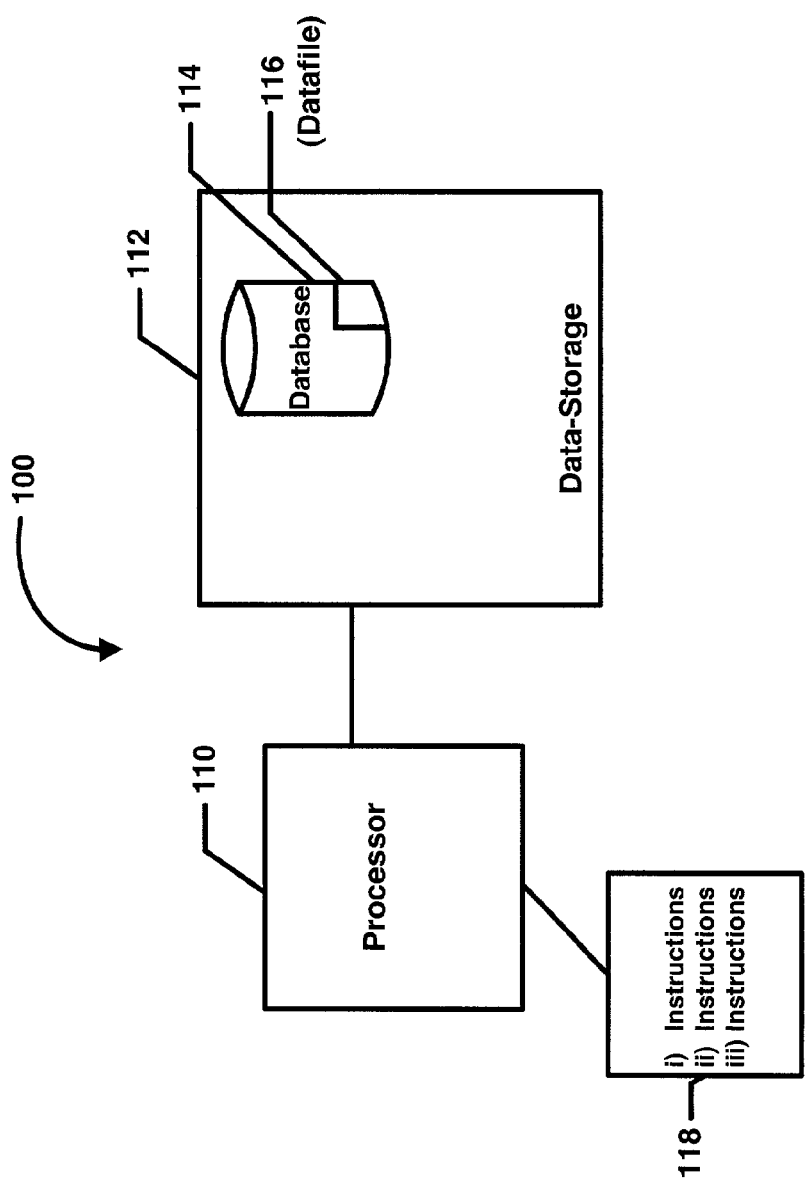
FIG. 1 is a block diagram depicting an arrangement for carrying out one of the exemplary embodiments.

Referring to the drawings, FIG. 1 generally depicts an arrangement 100 for carrying out an exemplary embodiment of the invention. As shown in FIG. 1, the arrangement 100 includes a processor 110, a data-storage 112, a database 114, and a database datafile 116. The database datafile 116 is stored on the data-storage 112, and contains one or more flags (hereinafter referred to as "deleted-data flags") that indicate that the database datafile 116 contains deleted user data.

Arrangement 100 also includes one or more program instructions, i.e., "code" 118 that are executable by the processor 110, and may be stored in the data storage 118. When executed by the processor 110, the code 118 may perform several functions to recover the deleted user data. One of these functions is receiving one or more inputs that are indicative of the database datafile to locate on the data-storage 112 the database datafile 116 possessing the deleted-data flags. Additionally, the code 118 may perform the function of ascertaining one or more addresses of deleted user data ("deleted-data addresses") that correspond to the deleted-data flags. After garnering the addresses of deleted user data, the code 118, when executed by the processor 110, may perform the function of altering one or more references in the database datafile that correspond to the deleted-data addresses to clear or remove the deleted-data flags. By clearing or removing the deleted-data flags the code may yield recovered user data. In addition to providing recovered user data, the code for performing the function of altering one or more references in the database datafile may also protect against having the recovered user data overwritten.

A. Processor

The processor 110 may take various forms. For instance, the processor 110 may be a processing part of a computer, a standalone personal computer (PC), or multiple computers networked together. In the networked situation, the computers may conform to one or more network architectures, such as a client-server architecture, a peer-to-peer architecture, a mainframe architecture, and/or any other networking architecture. Preferably, the processor 110 is configured as an enterprise servers coupled with workstations and/or personal computers; dumb terminals coupled to mainframes; and/or personal computers networked in ad-hoc form. Such coupling is not limited to wired connections, but wireless connectivity may also suffice.

B. Data Storage

Like the processor 110, the data-storage 112 included in arrangement 100 may take many forms. In one format, the data-storage 112 may be embodied as one or more digital-storage devices that are preferably integral to or integrated with the processor 110. In this arrangement, the data-storage 112 and the processor 110 are communicatively coupled to each other, thereby allowing the processor 110 and data-storage 112 to exchange data. In an alternate format, the data-storage 112 may be embodied as one or more stand-alone digital-storage devices, which are external, or otherwise separate from the processor 110. These stand-alone devices, like the internal devices, may be communicatively coupled with the processor using an external link, such as an Ethernet.

The data-storage 112, whether integral to, integrated into, and/or external to the processor 110, may comprise hard-drives, volatile and non-volatile memory, tape drives, optical media, and any other storage media capable of storing digital information. In combination, the processor 110 and data-storage 112 may provide a computing platform on which to store the database 114 and the database datafiles 116, and on which to run operating and application software applications or code, such as the DBMS programs, the database application programs, and the code 118.

C. Operating Software

Generally, the computing platform provided by the processor 110 and the data-storage 112 is managed by an operating system, such as IBM AIX, UNIX, Linux, Microsoft Windows, and/or any other operating system. The operating system may provide not only basic input and output functions, but also enhanced features and functions, such as data compression, to control the flow of data and program instructions through the processor 110 and data-storage 112. Further, the operating system generally includes a file management system for storing and retrieving files on the data-storage 112. The operating systems manage the interaction and processing of data and program instructions for the processor 110 and data-storage 112, thereby controlling how the application software and/or code 118 operates.

As previously noted, the computing platform for processing the user data and other valuable information (collectively referred to herein as "user data") may vary. Exemplary configurations of a computing platform running an operating system may include one or more PCs running (or managed by) Microsoft Windows or one or more UNIX workstations coupled to a UNIX managed server.

D. Database

Also illustrated in FIG. 1 is database 114. As defined by a database application or database-management system (collectively referred to herein as DBMS), database 114 includes one or more datafiles, such as database datafile 116. The database 114 may include various other files stored on the data-storage 112, as well. The DBMS, on the other hand, is one or more software applications executable by the processor 116 for storing, modifying, and extracting information from a database, such as the database 114. Additionally, the DBMS provides an interface for one or more users to input, sort, analyze, or otherwise manipulate collected user data.

Depending on the DBMS, the format of the database 114 may be relational, flat, and/or hierarchical. Preferably, the format of the database 114 may be defined by Oracle Corporation's family of DBMSs, including Oracle 8i, Oracle 9i, and/or any other Oracle DBMS. Alternatively, the database 114 may be defined by some other DBMS, such as Microsoft Corporation's SQL Server family of DBMSs, Sybase Corporation's family of DBMSs, and/or IBM's family of DBMSs. The database 114 may be defined using other DBMSs, as well.

Generally, when a user desires to access and use the database 114, the DBMS loads information including the user data and administrative data from the data-storage 112 into a first virtual workspace (that is cached into the data-storage 112 at periodic intervals). Contained within the first virtual workspace are several workspace objects or "schema objects." The DBMS uses the schema objects to present the user data in a perceptible manner. The schema objects may include one or more tables of user data, one or more indexes ("schema-indexes"), and/or one or more status records.

To facilitate presenting the user data, the portion of the first virtual workspace allocated for the user data may be organized into one or more tables. These tables contain user data that is formatted into a number of rows and/or columns. Alternatively, the virtual workspace may be organized into just rows or just columns. Other alternative configurations are possible as well.

To further facilitate presenting the user data, each schema-index contains administrative data, i.e., metadata or information about the user data. This metadata may be used by the DBMS to determine where the user data is located, so that it can be displayed the user data to the user. Generally, each of the schema-indexes correlates or is associated with a given set of user data, such as the user data contained in one of the tables, one of the rows, and/or one of the columns. Further, like the index in a book, each of the schema-indexes contains one or more addresses, pointers, and/or other locators that match-up with the user data.

The status records, like the schema-indexes, contain administrative data or metadata that may be used by the DBMS to determine the status of the user data within the database 114 and in turn the database datafile 116. Again, like the schema-indexes, the status records correlate with a given set of user data, such as the user data contained within one of the tables, one of the rows and/or one of the columns. Each of the status records may contain one or more indications, references, addresses, pointers, flags, and/or other notations so that the DBMS, the code 118, and/or other software application may determine the status of the user data. For instance, when the status of the user data changes in first virtual workspace (for example, when the user data is deleted from a table, column, and/or row), at least one of the status records that correlates with the changed user data likewise changes. Other status information about the user data, beyond containing the deleted status, may be reported in the status records, as well.

Figure 2:
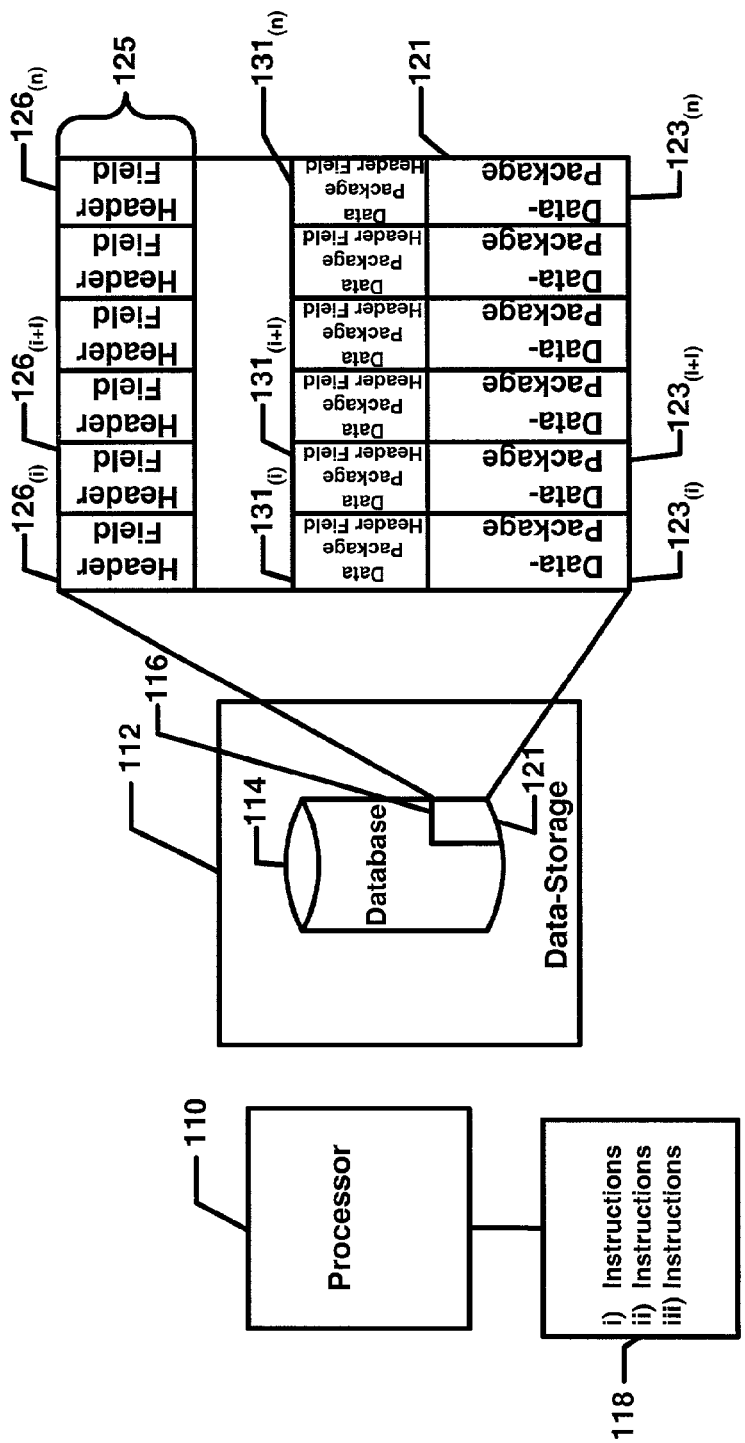
FIG. 2 is a second block diagram depicting a database that may be used in carrying out one of the exemplary embodiments.

FIG. 2 contains an illustration of a database datafile 116 that may be used in accordance with an exemplary embodiment. With reference to FIG. 2, the storage format of the user data within the database datafile 116 may emulate or parallel the storage format of the same user data within the first virtual workspace. For instance, a column of the user data contained within a table within the first virtual tablespace may be stored as single unit in a data package within a data-block 121 that is in turn contained within the database datafile 116. Just as the virtual workspace may contain multiple sets, clusters, rows, and/or columns of user data, the database datafile 116 may likewise contain multiple data-packages, such as data-packages $123_{(i)}$, $123_{(i+1)}$ ... $123_{(n)}$. Each of the data-packages $123_{(i)}$, $123_{(i+1)}$ ... $123_{(n)}$ may contain multiple sets, clusters, rows, and/or columns of user data. Preferably, however, each of the data-packages $123_{(i)}$, $123_{(i+1)}$ ... $123_{(n)}$ contains a only single set, cluster, row, or column of user data.

Additionally, the storage format of the user data within the database datafile 116 may follow the analogous format of the user data contained within the first virtual workspace by storing the data-packages $123_{(i)}$, $123_{(i+1)}$ ... $123_{(n)}$ in a sequence that matches the first virtual workspace. For example, the first virtual workspace may contain a table having several columns of user data including a first column, a second column, and a last column. Following the analogous format, the data-block 121 corresponds to the table, and the data-packages $123_{(i)}$, $123_{(i+1)}$ ... $123_{(n)}$ correspond to the columns of user data.

In tracking the sequence of the first virtual workspace, data-package $123_{(i)}$ may contain the first column of user data. Data-package $123_{(i+1)}$, which directly follows data-package $123_{(i)}$, may contain the second column of user data, and so on. This storage format may provide a cross-reference between the user data stored within the data-packages $123_{(i)}$, $123_{(i+1)}$ ... $123_{(n)}$ and the corresponding user data in virtual workspace. The cross-reference may be used in conjunction with one or more of the schema-indexes for locating the user data within the database datafile 116. Such cross-reference may be advantageous when the user data is no longer available in the first virtual workspace. Accordingly, storing the one or more schema-indexes, and the contents thereof, on the data-storage 112 may provide the DBMS and the code 118 with a mechanism for retrieving the user data. While capable of being stored anywhere on the data-storage 112 as its own file, the schema-indexes, and the contents thereof are preferably stored within the database datafile 116.

Generally, each schema-index contains a plurality of unique addresses or pointers that correlate with the sets, clusters, rows, and/or columns of user data within virtual workspace. And more preferably, each schema-index contains a unique, sequential address or pointer that correlates with each of the sets, clusters, rows, and/or columns. Ideally, this pointer represents a location, e.g., a row, column, or cell location within the first virtual workspace. Thus, for a given column of user data contained within one of the data-packages $123_{(i)}$, $123_{(i+1)}$ ... $123_{(n)}$, the schema-indexes, or the contents thereof, may contain a pointer that points to the data-package that contains the given column.

In one configuration, the size of each of the data-packages $123_{(i)}$, $123_{(i+1)}$ ... $123_{(n)}$ may be uniform, and thus, the database datafile 116 may allocate a predetermined amount of space on the data storage 112 for the data-packages. The DBMS and the code 118 may benefit from the database datafile 116 having the amount of space predetermined. Such benefit may be realized by defining and assigning the total number of pointers in the schema-indexes when the database datafile 116 is created. For instance, when the database datafile 116 is created, a certain amount of space (usually in bytes or octets) is allocated for the data-packages $123_{(i)}$, $123_{(i+1)}$ ... $123_{(n)}$. If the size of each data-package is uniform, and the amount of space allocated is an integer multiple of the uniform data-package, then the total number of data-packages in the database datafile 116 is easily determined by dividing the space allocated by the size of the uniform data-package. Once determining the total number of data-packages, the equivalent number of pointers may be created and assigned.

Such a uniform structure is not necessary, however. Preferably, the size of the data package, the amount of space allocated for user data, and/or the size of the database datafile 116 may vary, expanding and contracting as necessary. Consequently, the pointers may be assigned concurrently with the creation of the data-packages.

As an alternative to having only a single column or row of user data in the data-package, the format of the database datafile 116 may otherwise prescribe that multiple columns or rows of user data may be concatenated to form a contiguous set of columns or rows of user data. These contiguous sets of columns or rows may be stored in a single data-package. In this otherwise prescribed format, the schema-indexes may furnish an addressing scheme for parsing the stored user data from the single data-package. To facilitate this addressing scheme, the schema-indexes may provide one or more references that indicate (i) the starting point or starting address of the data-package and (ii) number of bytes or octets that each column or row consumes within the data-package. By consulting these references, the DBMS and/or the code 118 may parse each column and row from the data-package.

E. Database Datafile

As a component of the database, the database datafile 116 is stored on the data-storage 112. The database datafile 116 may be stored as an operating system file, as a RAW file or device, or any other storage format. Stemming from the format of the database 114, the format of the user data stored within the database datafile 116 may be relational, flat, and/or hierarchical. The structure or composition of the database datafile 116 may likewise vary depending upon which DBMS defines the database. Preferably, the database datafile 116 comprises a logical, building-block structure having several layers.

One, and ideally the smallest, layer of the building block structure of the database datafile 116 is the data-block 121. The data-block 121 as a part of the database datafile 116 is stored on the data-storage 112, and accordingly, consumes a number of physical addresses on the data storage 112. The data-block 121, however, may contain a number of internally defined or intrinsic addresses for cross-referencing purposes. These internally defined addresses may relate to the physical address, and may represent the locations of the user data within the data-block 121, which the DBMS and/or the code 118 may use to locate user data without referring to the physical addresses. These physical and/or intrinsic addresses may be linked to the components of the data-block 121 for locating user data.

In addition to containing user data in its data-packages $123_{(i)}$, $123_{(i+1)}$ . . . $123_{(n)}$, the data-block 121 may also contain the corresponding administrative data or "data-block metadata" for each of the data-packages. This data-block metadata may replicate the metadata contained in the schema objects. In particular, the data-block metadata preferably replicates the metadata contained within the schema-indexes and status records.

The data-block 121 includes a data-block header 125 for holding the data-block metadata. The format of the data-block header 125 generally provides a structure for carrying the data-block metadata. This structure may take the form of a data-directory that includes a number of fields that house the data-block metadata for each of the data-packages $123_{(i)}$, $123_{(i+1)}$ . . . $123_{(n)}$. Alternatively, the organization or structure of the data-block header 125 in itself may reflect the data-block metadata for the data-packages $123_{(i)}$, $123_{(i+1)}$ . . . $123_{(n)}$.

In its structure, the data-block header 125 may define one or more data-block header fields, such as data-block header fields $126_{(i)}$, $126_{(i+1)}$ . . . $126_{(n)}$. As the data-directory for the data-block 121, the data-block header 125 and in turn the data-block header fields $126_{(i)}$, $126_{(i+1)}$ . . . $126_{(n)}$ may be organized so that the data-block header fields $126_{(i)}$, $126_{(i+1)}$ . . . $126_{(n)}$ may cross-reference with data-packages $123_{(i)}$, $123_{(i+1)}$ . . . $123_{(n)}$, respectively. That is, the data-block-header field $126_{(i)}$ is cross-referenced with data-package $123_{(i)}$, data-block-header field $126_{(i+1)}$ is cross-referenced with data-package $123_{(i)}$, and so on.

The organization of the data-block header fields $126_{(i)}$, $126_{(i+1)}$ . . . $126_{(n)}$, however, may vary. In one variation, for example, the data-block header 125 may replicate or track the organization or contents of the schema-indexes. In replicating the arrangement of the schema-indexes, the data-block header fields $126_{(i)}$, $126_{(i+1)}$ . . . $126_{(n)}$ may directly or indirectly correspond to analogous fields in the schema-indexes. In the direct approach, the arrangement of the data-block header fields $126_{(i)}$, $126_{(i+1)}$ . . . $126_{(n)}$ may replicate the organization of the schema-indexes. In the indirect approach, the data-block header fields $126_{(i)}$, $126_{(i+1)}$ . . . $126_{(n)}$ contains the contents of the corresponding schema-indexes, and thus may contain the corresponding pointers from the schema-indexes for the user data contained within data-packages $123_{(i)}$, $123_{(i+1)}$ . . . $123_{(n)}$.

Besides replicating the pointers from the schema-indexes, if any, the contents of the data-block header 125, and the data-block header fields $126_{(i)}$, $126_{(i+1)}$ . . . $126_{(n)}$ may contain other metadata, such as the respective physical or intrinsic addresses for data packages $123_{(i)}$, $123_{(i+1)}$. . . $123_{(n)}$. If, for example, the user data is stored in a single data package, the data-block header fields $126_{(i)}$, $126_{(i+1)}$ . . . $126_{(m)}$ may contain one or more pointers for parsing the user data from the data-package.

In addition to containing metadata for locating the user data, the contents of the data-block header 125, and in turn the data-block header fields $126_{(i)}$, $126_{(i+1)}$ . . . $126_{(n)}$ may contain metadata concerning the status of the user data contained within the data-packages $123_{(i)}$, $123_{(i+1)}$ . . . $123_{(n)}$. This status information preferably reflects the metadata contained within the status records of the schema-objects. For example, in the data-block 121, single columns of user data from the first virtual workspace may be stored in each of the data-packages $123_{(i)}$, $123_{(i+1)}$ . . . $123_{(n)}$. If in a later transaction, the column of user data contained within the data-package $123_{(i)}$ is deleted or otherwise modified, it undergoes a status change. Consequently, this status change causes the DBMS to update one or more of the status records that correlate with the column. In turn, the status change reflected in the status records is stored in the header field $126_{(i)}$ as a status indication or status flag ("data-block-status flag").

This data-block-status flag, as well as each of the other data-block's data-block-status flags, may include one or more binary numbers (bin), hexadecimal numbers (hex), and/or other notations. For example, a 2E(hex) notation in the data-block header field $126_{(i)}$ may indicate that the column of data contained within the data-package $123_{(i)}$ is deleted, whereas a 3E(hex) notation may indicate that the column of data is not deleted. Thus, in this arrangement, if each of the data-block header fields $126_{(i)}$, $126_{(i+1)}$ . . . $126_{(n)}$ contain a 2E(hex), then each of the data-packages $123_{(i)}$, $123_{(i+1)}$ . . . $123_{(n)}$ contains a column of deleted user data.

As previously noted, the user data contained within the data-packages $123_{(i)}$, $123_{(i+1)}$ . . . $123_{(n)}$ may originate from the sets, clusters, rows, and/or columns of user data in first virtual workspace, where each of the data-packages $123_{(i)}$, $123_{(i+1)}$ . . . $123_{(n)}$ contains a predetermined amount of user data. Preferably, the amount of user data contained within each of the data-packages $123_{(i)}$, $123_{(i+1)}$ . . . $123_{(n)}$ is uniform, i.e., the amount of space (in bytes, octets or other unit of measure for digital data) for user data in each data-package is the same. Similarly, each of the data-packages $123_{(i)}$, $123_{(i+1)}$ ... $123_{(n)}$ is also preferably uniformly sized, at least in terms of bytes. In alternate configurations, the amount of user data in the data-packages and the size of the data-packages, however, may vary. And so, each of the data-packages $123_{(i)}$, $123_{(i+1)}$ ... $123_{(n)}$ may contain more than one table, row, and/or column of user data, or parts thereof.

Besides accommodating user data, each of the data-packages $123_{(i)}$, $123_{(i+1)}$ ... $123_{(n)}$ may contain a respective data-package header, namely the data-package headers $131_{(i)}$, $131_{(i+1)}$ ... $131_{(n)}$. Similar to the data-block header 125, each of these data-package headers may provide a storage location for metadata that coincides with the user data stored within the respective data-packages. Again, similar to the data-block header 125, each of the data-package headers $131_{(i)}$, $131_{(i+1)}$ ... $131_{(n)}$ may contain cross-referencing information, and status flags. Thus, when a status change occurs (for example, when user data is deleted), the notation contained within the status records may be reflected in the form of one or more data-package-status flags in the corresponding data-package headers $131_{(i)}$, $131_{(i+1)}$ ... $131_{(n)}$. Each of these data-package-status flags may contain one or more indications, records, references, pointers, and/or other notations that reflect deleted user data.

F. Program Instructions

Using the structure of the database datafile 116 including the structure of the data-block 121 and the data-packages $123_{(i)}$, $123_{(i+1)}$ ... $123_{(n)}$, the code 118, when executed by the processor 110, may carry out various functions described herein, and may provide a mechanism for recovering deleted user data. Included among these functions are (i) receiving one or more inputs that are indicative of the database datafile, (ii) ascertaining one or more addresses of deleted user data ("deleted-data addresses") that correspond to the deleted-data flags, and (iii) altering one or more references in the database datafile that correspond to the deleted-data addresses.

The code 118 for receiving one or more inputs that are indicative of the database datafile may encompass one or more machine or high-level language instructions ("instructions") that request information about the database datafile 116. This information may include the database datafile name, the date the database datafile was last accessed, and/or the database datafile's tables last used. Preferably included among this information is an indication or other notation that indicates that the database datafile 116 contains deleted user data.

To run the code 118 for receiving one or more inputs that are indicative of the database datafile, the processor 110 may include an input and an input device, such as a universal-serial bus ("USB") port that is communicatively coupled with a terminal and keyboard. Alternately, the processor 110 may provide an Ethernet link for receiving the at least one input from another processor or other computing device using the Ethernet, or IEEE 802.3 protocol. In yet another arrangement, the processor 110 may provide a wireless interface for coupling to a wireless media over which it may receive the at least one input indicative of the database datafile from a wireless device, such as a cellular telephone.

Beyond having the code 118 for receiving one or more inputs that are indicative of the database datafile, the code 118 may also include instructions for carrying out the function of ascertaining one or more deleted-data addresses. In one configuration, the code 118 may include instructions for performing the function of ascertaining one or more deleted-data addresses by examining one or more header fields of the data-block header 125 for a data-block-status flag or other notation that indicates that the data-block contains deleted user data (referred to hereinafter as "first-deleted-data flag").

Examining one or more header fields of the data-block header 125 may include loading the contents of data-block header fields $126_{(i)}$, $126_{(i+1)}$ ... $126_{(n)}$ from the data-storage 112 into a second virtual workspace (that is cached into the data-storage 112 at periodic intervals), and then comparing the contents of the data-block header fields $126_{(i)}$, $126_{(i+1)}$ ... $126_{(n)}$ with a known mask or filter. Masking or filtering may determine if any of the data-block header fields $126_{(i)}$, $126_{(i+1)}$ ... $126_{(n)}$ contain a first-deleted-data flag. To facilitate masking or filtering, the code 118 may include instructions to load the data-block header fields $126_{(i)}$, $126_{(i+1)}$ ... $126_{(n)}$ into the second virtual workspace, and then compare the data-block header fields $126_{(i)}$, $126_{(i+1)}$ ... $126_{(n)}$ to a mask one at a time, all at once, or any other frequency. Alternatively, if the database datafile 116 contains only one data-package or if the data-block header fields $126_{(i)}$, $126_{(i+1)}$ ... $126_{(n)}$ containing one or more of the deleted-data status flags have already been determined, then the code 118 for examining one or more of the data-block header fields $126_{(i)}$, $126_{(i+1)}$ ... $126_{(n)}$ may be omitted.

After locating one or more of the first-deleted-data flags, the function of ascertaining one or more deleted-data addresses may be carried out using the organization of the data-block header fields $126_{(i)}$, $126_{(i+1)}$ ... $126_{(n)}$. Depending on the structure of the data-block header 125, this function may be accomplished using various approaches. For example, if the data-block header fields $126_{(i)}$, $126_{(i+1)}$ ... $126_{(n)}$ are organized so that each of the data-block header fields $126_{(i)}$, $126_{(i+1)}$ ... $126_{(n)}$, matches up with the each of the data-packages $123_{(i)}$, and $123_{(i+1)}$ ... $123_{(n)}$, respectively, and if the data-block header field $126_{(i+1)}$ contains first-deleted-data flag, then after determining the starting address and the number of bytes of the data-package $123_{(i)}$, the code 118 may ascertain the deleted-data address of the data-package $123_{(i+1)}$ by adding the number of bytes of the data-package $123_{(i)}$ to the starting address. Details on program instructions, which may be integrated or incorporated into the code 118, for determining the starting address and the number of bytes of a preferred data-package, may be found in RDBMS QUICK REFERENCE GUIDE, Article-ID: Note 33188.1[online], July 1996, retrieved from Internet at http://www.rigreen.freeserve.co.uk/oracle/oracle_ notes/dba/rdbms_quickref.html. These details are fully incorporated herein by reference.

In addition to using the structure of the data-block header 125, the code 118 may include instructions for ascertaining one or more deleted-data addresses by using the pointers and/or cross-referencing addresses contained within data-block header fields $126_{(i)}$, $126_{(i+1)}$ ... $126_{(n)}$. To perform this function, the code 118 may preferably include instructions for querying the contents of the data-block header fields $126_{(i)}$, $126_{(i+1)}$ ... $126_{(n)}$ for the pointers and cross-referencing addresses by masking or filtering the data-block header fields $126_{(i)}$, $126_{(i+1)}$ ... $126_{(n)}$ using a mask or filter that uncovers the addresses of the data-packages. Preferably, the code 118 includes instructions that only queries the data-block header fields $126_{(i)}$, $126_{(i+1)}$ ... $126_{(n)}$ that contain the first-deleted-data flags. Other simpler, as well as more complex, configurations for the function of ascertaining one or more deleted-data addresses in the data-block header are possible.

Since each of the data-packages $123_{(i)}$, $123_{(i+1)}$ ... $123_{(n)}$ may contain status information, another mechanism for ascertaining one or more deleted-data addresses may be provided using the data-package header fields $131_{(i)}$, $131_{(i+1)}$ ... $131_{(n)}$. For example, data package $123_{(n)}$ may include data-package header field $131_{(n)}$, which carries status information for the user data stored in the data package $123_{(n)}$. And if the data package $123_{(n)}$ contains user data that has been deleted, then incorporated or integrated into data-package header field $131_{(n)}$ is the data-package-status flag, which in this case carries an indication that data-package $123_{(n)}$ contains deleted user data (referred to hereinafter as "second-deleted-data flag").

Similar to the code 118 for querying the header fields in the data-block header 125, the code 118 may include instructions for querying the data-package header fields $131_{(i)}$, $131_{(i+1)}$ ... $131_{(n)}$. This query function may be provided by instructions that cause the processor to load one or more of the data-package header fields into a third virtual workspace (in which the contents are cached into the data-storage 112 at periodic intervals). When loaded in the third virtual workspace, the code 118 may direct the processor 110 to compare the contents of the data-package header fields $131_{(i)}$, $131_{(i+1)}$ ... $131_{(n)}$ with a mask or filter for determining if one or more of the data-package header fields $131_{(i)}$, $131_{(i+1)}$ ... $131_{(n)}$ contain second-deleted-data flags.

After locating one or more of the data-package header fields $131_{(i)}$, $131_{(i+1)}$ ... $131_{(n)}$ containing second-deleted-data flags, the function of ascertaining one or more deleted-data addresses may be facilitated by using the structure the data-package header 125, as noted above.

Alternatively, with the aid of the cross-referencing addresses or pointers contained within data-block header 125, and the data-block header fields $126_{(i)}$, $126_{(i+1)}$ ... $126_{(n)}$, the code 118 may include instructions that direct the processor 110 to ascertain one or more deleted-data addresses. For example, if the data-block header 125 contains data-block header fields $126_{(i)}$, $126_{(i+1)}$ ... $126_{(n)}$, and each of the data-block header fields $126_{(i)}$, $126_{(i+1)}$ ... $126_{(n)}$ contains metadata for data-packages $123_{(i)}$, $123_{(i+1)}$ ... $123_{(n)}$, respectively, then the code 118 may include instructions that use the parallel structure to create a one-to-one association between the data packages $123_{(i)}$, $123_{(i+1)}$ ... $123_{(n)}$ and the data-block header fields $126_{(i)}$, $126_{(i+1)}$ ... $126_{(n)}$. Using this one-to-one association, and after determining that data-package $123_{(n)}$ contains a second-deleted-data flag, the code 118 may include instructions to locate the data-block header field $126_{(n)}$. Then, by including instructions to apply a mask or filter to the contents of data-block header field $126_{(n)}$, when executed by the processor 110, the code 118 may ascertain the address of the data-package $123_{(n)}$. This address may be the physical address or the intrinsic address of the data-package $123_{(n)}$ within the data-block 121.

The code 118 for performing the function of ascertaining one or more deleted-data addresses, however, may omit instructions that use the data-block header and its constituents. Such omission may cause the code 118 to provide the function by ascertaining the physical addresses or intrinsic address of the each of the data-packages $123_{(i)}$, $123_{(i+1)}$ ... $123_{(n)}$ by cataloging the data-storage 112 using the file management system of the operating system or the DBMS. From cataloging the data storage 112, the physical address of the data-block 121 and its constituents may be determined. Using the physical address information from the cataloging, the code 118 may provide instructions that direct the processor to load the data-packages $123_{(i)}$, $123_{(i+1)}$ ... $123_{(n)}$ into the third virtual workspace, as before. The code 118 also provides instructions that direct the processor 110 to compare the contents of the data-package header fields $131_{(i)}$, $131_{(i+1)}$ ... $131_{(n)}$ loaded in the third virtual workspace with a mask or filter to determine if one or more of the data-package header fields $131_{(i)}$, $131_{(i+1)}$ ... $131_{(n)}$ contains second-deleted-data flags. Once determining the data-package header fields $131_{(i)}$, $131_{(i+1)}$ ... $131_{(n)}$ that contain the second-deleted-data flags, the address of the deleted user data becomes apparent.

In addition to the providing instructions to ascertain one or more deleted-data addresses, the code 118 may includes instructions for performing the function of altering one or more references in the database datafile that correspond to the deleted-data addresses. These instructions may be machine or high-level language instructions.

The code 118 for performing the function of altering one or more references in the database datafile that correspond to the deleted-data addresses may include instructions for altering the data-block header fields $126_{(i)}$, $126_{(i+1)}$ ... $126_{(n)}$ to remove, reset or clear the first-deleted-data flags. Likewise, the code 118 may include instructions for altering the data-package header fields $131_{(i)}$, $131_{(i+1)}$ ... $131_{(n)}$ to remove, reset or clear the second-deleted-data flags. Preferably, the code 118 includes instructions for altering both the data-block header fields $126_{(i)}$, $126_{(i+1)}$ ... $126_{(n)}$ that contain first-deleted-data flags, and the data-package header fields $131_{(i)}$, $131_{(i+1)}$ ... $131_{(n)}$ that contain second-deleted-data status flags.

The code 118 for altering the first-deleted-data flags may include instructions that direct the processor 110 to load each of the data-block header fields $126_{(i)}$, $126_{(i+1)}$ ... $126_{(n)}$ containing first-deleted-data flags into a fourth virtual workspace, and to change or otherwise manipulate these data-block header fields $126_{(i)}$, $126_{(i+1)}$ ... $126_{(n)}$ to clear the first-deleted-data flags. Analogously, in altering the second-deleted-data flag, the code 118 may include instructions directing the processor 110 to load each of the data-package header fields $131_{(i)}$, $131_{(i+1)}$ ... $131_{(n)}$ that contain the second-deleted-data flags into a fifth virtual workspace, and to change or manipulate these data-package header fields to clear the second-deleted-data flags.

Additionally, the code 118 may include other machine or high-level language instructions to perform the function of searching the database datafile for one or more flags indicative of deleted user data. Preferably, this function is carried out by directing the processor to search the data-block 121.

To facilitate searching the data-block 121, the code 118 may include instructions to load the data-block 121 into a sixth virtual workspace, and to search the data-block for flags, such as the first-deleted-data flag and the second-deleted data flag. Preferably, the code 118 includes instructions for loading into the sixth virtual workspace only the data-block header 125, the data-block header fields $126_{(i)}$, $126_{(i+1)}$ ... $126_{(n)}$, the data-packages $123_{(i)}$, $123_{(i+1)}$ ... $123_{(n)}$, or the data-package header fields $131_{(i)}$, $131_{(i+1)}$ ... $131_{(n)}$. If either the data-block header 125 or the data-block header fields $126_{(i)}$, $126_{(i+1)}$ ... $126_{(n)}$ are loaded, the code 118 directs the processor 110 to perform a search for one or more first-deleted-data flags. On the other hand, if the code 118 directs the processor 110 to load either the data-packages $123_{(i)}$, $123_{(i+1)}$ ... $123_{(n)}$ or the data-package header fields $131_{(i)}$, $131_{(i+1)}$ ... $131_{(n)}$, the code 118 may include instructions directing the processor 110 to perform a search for one or more second-deleted-data flags.

3. Functions for Performing Data Recovery

Figure 3:
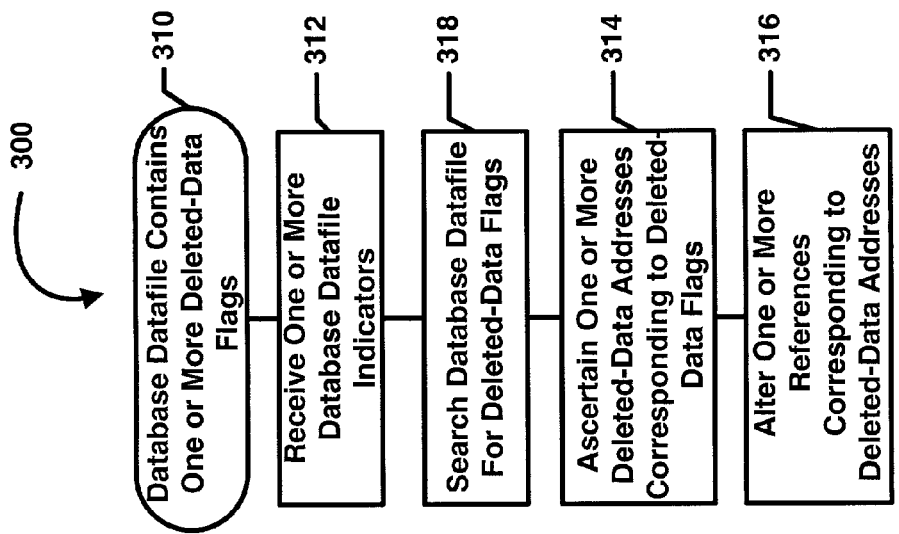
FIG. 3 is a flow chart illustrating the functions used for accomplishing data recovery in accordance with one of the exemplary embodiments.

Referring now to FIG. 3, a simplified flow chart 300 is provided depicting the functions used to accomplish user data recovery in accordance with an exemplary embodiment. The following functions shown in FIG. 3 may be described with reference to both FIG. 1 and FIG. 2. As shown at box 310, to begin with, the database datafile 116 contains one or more flags that indicate the database datafile 116 contains deleted user data ("deleted-data flags"). These deleted-data flags may include one or more of the first-deleted-data flags, and/or one or more of the second-deleted-data flags.

A. Receiving Datafile Descriptors

At box 312, the function of receiving at least one input indicative of the database datafile is shown. Processor 110 may perform this function by receiving inputs through an input port and using a input device, such as keyboard connected to an ISA or system input port. The types of inputs indicative of the database datafile may be the database datafile name, the date the database datafile was last accessed, the database datafile's size, and/or any other information that enables locating the database datafile of concern. This function may be carried out in many other ways, as well.

B. Ascertaining Deleted-Data Addresses

Next, in box 314, the function of ascertaining one or more address of deleted user data corresponding to deleted-data flags is shown. This function may be accomplished by querying or examining the data-block header fields $126_{(i)}$, $126_{(i+1)}$ ... $126_{(n)}$, for one of more status flags, such as the first-deleted-data flags. Then, after determining that the data-block header fields $126_{(i)}$, $126_{(i+1)}$ ... $126_{(n)}$ contain one or more of the first-deleted-data flags, the address of the deleted user data may be ascertained by querying or examining the contents of such data-block header fields. For instance, suppose that only data-block header $126_{(i+1)}$ contains a first-deleted-data flag. By first querying or comparing each of the data-block header fields $126_{(i)}$, $126_{(i+1)}$ ... $126_{(n)}$ using a mask or filter for locating first-deleted-data-flags, the first-deleted-data flag contained within the data-block header field $126_{(i+1)}$ may be uncovered. Then, by further masking or filtering the contents of data-block header field $126_{(i+1)}$, a cross-referencing address or pointer contained within the data-block header field $126_{(i+1)}$ may also be uncovered.

The function of ascertaining one or more address of deleted user data corresponding to the deleted-data flag may be performed in an alternative fashion. In a preferred arrangement where the data-package header fields $131_{(i)}$, $131_{(i+1)}$ ... $131_{(n)}$ correspond to the data-packages $123_{(i)}$, $123_{(i+1)}$ ... $123_{(n)}$, respectively, if any of the data-packages $123_{(i)}$, $123_{(i+1)}$ ... $123_{(n)}$ contain deleted user data, then the corresponding data-package header fields $131_{(i)}$, $131_{(i+1)}$ ... $131_{(n)}$ contains a second-deleted-data flag. Once locating one or more of the data-package header fields $131_{(i)}$, $131_{(i+1)}$ ... $131_{(n)}$ containing a second-deleted-data flag, the address of the deleted user data may be ascertained by masking or filtering the data-package header fields for the corresponding data-packages' addresses.

Alternatively, after locating one or more of the data-package header fields $131_{(i)}$, $131_{(i+1)}$ ... $131_{(n)}$ containing a second-deleted-data flag, referencing the corresponding data-block header fields $126_{(i)}$, $126_{(i+1)}$ ... $126_{(n)}$ may yield the addresses of the data-packages containing the deleted user data. In this case, the data-block header fields $126_{(i)}$, $126_{(i+1)}$ ... $126_{(n)}$ may contain the physical addresses or data-block's intrinsic addresses.

C. Altering References in Datafile

In addition to ascertaining the one or more addresses of deleted user data, also included is the function of altering one or more references in the database datafile that correspond to the one or more addresses of deleted user data, as shown in box 316. The function of altering one or more references in this context may include clearing, modifying, editing, exchanging or otherwise changing the value of the references and then saving the changes in the same location. Altering one or more references in database datafile may be carried out by the processor 110 loading the data-block header fields $126_{(i)}$, $126_{(i+1)}$ ... $126_{(n)}$ that contain first-deleted-data flags into a seventh virtual workspace. Then, the processor 110 modifies the data-block header fields containing first-deleted-data flags to remove the first-deleted-data flags or to modify the data-block header fields so they no longer reflect the notations represented by first-deleted-data flags.

The function of altering one or more reference in the database datafile may be carried out alternatively by loading the data-package header fields $131_{(i)}$, $131_{(i+1)}$ ... $131_{(n)}$ that contain second-deleted-data flags into a eighth virtual workspace, and modifying the appropriate data-package header fields to remove the second-deleted-data flags. Like the other previously described functions, the function of altering one or more references in the database datafile that correspond to the deleted-data flags may be performed in various other ways.

D. Searching for Deleted-Data Flags

Also illustrated in FIG. 3, at block 318, is the function of searching the database datafile for the one or more deleted-data flags. As similar to, but distinguished from ascertaining one or more addresses of deleted user data shown in block 314, the function of searching the database datafile for one or more deleted-data flags may be performed by starting with a known mask or filter that represents deleted user data, such as 2E(hex) number, and doing a byte-by-byte search of the database datafile for it. Alternatively, the function of searching may be achieved by loading the database datafile or some component thereof, such as the data-block 121, into a ninth virtual workspace and doing a byte-by-byte search for the deleted-user-data flags, such as first-deleted-data flags and/or second-deleted-data flags. The function of searching the database datafile may include using other searching techniques, as well.

4. Alternative Exemplary Architecture

Figure 4:
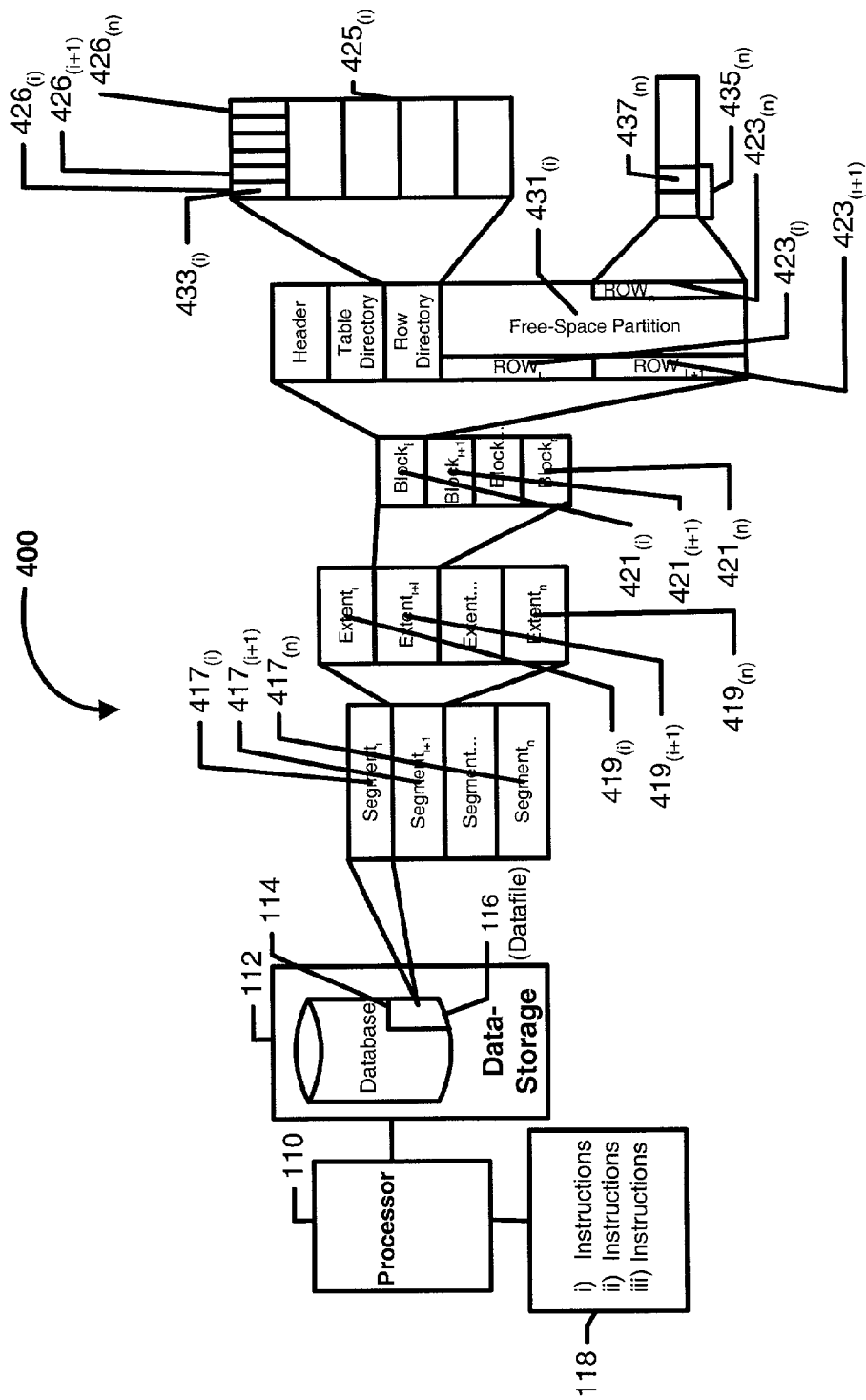
FIG. 4 is a third block diagram depicting an arrangement for carrying out one of the exemplary embodiments.

Referring now to FIG. 4, an arrangement 400 is provided to illustrate exemplary database datafile 410 that may be used for carrying out the recovery of user data in accordance with an exemplary embodiment. To facilitate carrying out the recovery of user data, database datafile 410 may be used in conjunction with architecture that is similar to that previously described, and illustrated in FIG. 1. Database datafile 410 is similar to database datafile 116 in most respects, as except as provided herein. Database datafile 410, however, preferably represents an Oracle 8i datafile, and therefore, may contain (i) one or more segments, such as segments $417_{(i)}$, $417_{(i+1)}$ ... $417_{(n)}$; (ii) one or more extents, such as extents $419_{(i)}$, $419_{(i+1)}$ ... $419_{(n)}$; (iii) one or more data-blocks, such as blocks $421_{(i)}$, $421_{(i+1)}$ ... $421_{(n)}$; and (iv) one or more rows, such as rows $423_{(i)}$, $423_{(i+1)}$ ... $423_{(n)}$.

A. Representative Oracle Database

With reference to FIG. 4, the files that define database 114, as embodied by an Oracle 8i database, are created and stored on the data-storage 112 by an Oracle 8i DBMS. These files reflect the contents of an Oracle 8i database "instance" ("Oracle instance"). Each Oracle instance defines at least one tablespace. Preferably, the Oracle instance contains two tablespaces, namely, a system tablespace, and a data tablespace. Such a configuration allows maintaining the user data separate from DBMS's files. Each tablespace, whether a system tablespace or data tablespace, represents the virtual work area in which users perform transactions that include entering, modifying, sorting and analyzing the user data previously collected by the users.

The tablespace furnishes an interface, which permits users to perceive the user data, and which provides a mechanism for the user to perform transactions. In addition to the interface, the tablespace possesses one or more schema objects, which are preferably stored within the database datafile 410.

Each of the tablespaces may contain its own schema objects. For example, the schema objects found in the system tablespace may include a data dictionary, one or more tables, one or more clusters, one ore more indexes, one or more view definitions, one or more stored procedures, one or more database triggers, and/or one or more sequences. The data tablespace, if any, may contain the same type schema objects, excluding the data dictionary.

The schema objects may be stored as separate files within the database datafile 410 or may be integrated into other portions of the database datafile 410. Consequently, the schema objects may be stored on the data storage 112 within one or more database datafiles, one or more index or control files; one or more redologs; and/or other types of database files.

B. Oracle Database Datafile Paradigm

Like database datafile 116, the database datafile 410 may be stored on the data-storage 112 as an operating system file, in raw file or device format, or any other storage format. The size of the database datafile 410 is determined using the DBMS's minimum file size. In the preferred embodiment of the database datafile 410, the Oracle 8i database datafile's size may be determined by the size and number of the blocks $421_{(i)}, 421_{(i+1)} \ldots 421_{(n)}$ contained within. The size of each of the blocks $421_{(i)}, 421_{(i+1)} \ldots 421_{(n)}$ in an Oracle 8i database datafile may vary from a minimum size of 2048 bytes to 64,256 bytes.

The structure of database datafile 410 follows a logical, building-block structure having several layers, preferably having at least three layers. Each of the layers contains a plurality of substantially similarly sized and structured units, which in effect, may partition each of the layers into a plurality of similarly sized and structured units. Contained within each of these units are one or more of similarly sized and structured units from an underlying layer. In the Oracle 8i database datafile, the first (or outermost) of the three layers of the database datafile 410 is the segment layer, which is partitioned into a segment header and one or more segments, such as segments $417_{(i)}, 417_{(i+1)} \ldots 417_{(n)}$. The segment header and the segments define the space allocated for the schema objects for a particular tablespace.

The Oracle 8i database datafile may contain several different types of segments, including one or more data segments, index segments, rollback segments, and/or the temporary segments. Each of the index segments contains records that furnish a directory for the database datafile 410. Each of the rollback segments stores "rollback" information, like a "undo" cache, for restoring user data after a transaction is committed. The temporary segments contain temporary storage locations that are used during various DBMS's operations. Each of the data segments contains the user data.

Each of the segments $417_{(i)}, 417_{(i+1)} \ldots 417_{(n)}$ may be partitioned a plurality of sub-segment units or extents. The plurality of extents, such as extents $419_{(i)}, 419_{(i+1)} \ldots 419_{(n)}$, comprise the second layer or extent layer of the building-block structure. Additionally, each of the extents $419_{(i)}, 419_{(i+1)} \ldots 419_{(n)}$ has an extent header, which contains information about the respective extent's contents. Each of the extents $419_{(i)}, 419_{(i+1)} \ldots 419_{(n)}$ within the extent layer may be partitioned into a plurality of sub-extent units or blocks, which define the third (or innermost) of the three-layered building blocks.

The third layer accommodates one or more "blocks," such as blocks $421_{(i)}, 421_{(i+1)} \ldots 421_{(n)}$. User data as well as metadata may be stored within each of the blocks $421_{(i)}, 421_{(i+1)} \ldots 421_{(n)}$. To house the user data and the metadata, each of the blocks $421_{(i)}, 421_{(i+1)} \ldots 421_{(n)}$ is preferably partitioned into several block sections. Among the partitions are a block header, a cache layer, a transaction layer, a table directory, a row directory, a free-space partition, and one or more rows. Most of these sections contain metadata. The user data, however, is stored in the one or more rows. In block $421_{(i)}$, for example, the block header $427_{(i)}$, the cache layer (not shown), the transaction layer (not shown), the table directory $429_{(i)}$, and the row directory $425_{(i)}$ contain metadata used by the DBMS for management purposes. The user data within block $421_{(i)}$ is enclosed within the rows $423_{(i)}, 423_{(i+1)} \ldots 423_{(n)}$.

In block $421_{(i)}$, the row directory $425_{(i)}$ by its structure and content may provide a directory for locating the rows $423_{(i)}, 423_{(i+1)} \ldots 423_{(n)}$. Included within therow directory $425_{(i)}$ are one or more row-directory-header fields $426_{(i)}, 426_{(i+1)} \ldots 426_{(n)}$, one for each possible row within the block. The row-directory-header fields $426_{(i)}, 426_{(i+1)} \ldots 426_{(n)}$ may be indexed according to the table and column of user data from which it came. This means that as a directory for the rows $423_{(i)}, 423_{(i+1)} \ldots 423_{(n)}$, the row-directory-header fields $426_{(i)}, 426_{(i+1)} \ldots 426_{(n)}$ may contain metadata for the respective rows $423_{(i)}, 423_{(i+1)} \ldots 423_{(n)}$, if each of the rows $423_{(i)}, 423_{(i+1)} \ldots 423_{(n)}$ contains a column of user data. In addition to the indexing, the row-directory-header fields $426_{(i)}, 426_{(i+1)} \ldots 426_{(n)}$ may preferably contain the physical or intrinsic addresses of the each of the rows $423_{(i)}, 423_{(i+1)} \ldots 423_{(n)}$.

Over and above carrying the addresses, the row-directory-header fields $426_{(i)}, 426_{(i+1)} \ldots 426_{(n)}$ may also contain one or more status flags that indicate the status of the rows $423_{(i)}, 423_{(i+1)} \ldots 423_{(n)}$. If the user data within the rows $423_{(i)}, 423_{(i+1)} \ldots 423_{(n)}$ is deleted, such status is reflected by the status flags. The status flags contained within the row-directory-header fields $426_{(i)}, 426_{(i+1)} \ldots 426_{(n)}$ may be one or more indications, references, flags, and/or records that contain a binary number (bin), a hexadecimal number (hex), or some other notation representing the status of a particular row of data. For instance, the row-directory-header fields $426_{(i)}$, which preferably corresponds to row $423_{(i)}$, may contain a status flag $433_{(i)}$ that carries a 2C(hex) number, and thus, indicates that user data within row $423_{(i)}$ is deleted. On the other hand, if the flag $433_{(i)}$ carries a 3C(hex) number, then the status flag $433_{(i)}$ would not indicate that the user data within row $423_{(i)}$ is deleted.

Panning back from the row-directory-header fields $426_{(i)}, 426_{(i+1)} \ldots 426_{(n)}$ and the rows $423_{(i)}, 423_{(i+1)} \ldots 423_{(n)}$, the block $421_{(i)}$ possesses within its data-layer the free-space partition $431_{(i)}$. This free-space partition $431_{(i)}$ defines the available free space within block $421_{(i)}$ for holding the rows of user data, which may expand and contract depending on the number of rows in the block $421_{(i)}$. As the number of rows within block $421_{(i)}$ increases, the free space decreases. On the other hand, as the number of rows within block $421_{(i)}$ decreases, the free-space partition increases. Thus, when a row's status flag indicates that the row contains deleted user data, the free-space partition may assimilate the corresponding row into its free-space. Consequently, the size of the free-space section $431_{(i)}$ is monitored by the DBMS for storing the user data within the block $421_{(i)}$. To facilitate monitoring the free-space section $431_{(i)}$, the block's transaction layer contains one or more references or pointers, which denote several parameters of the free-space section $431_{(i)}$. These pointers include the $(i)$ the First Free Row Index (FRRE), (ii) the Free Space Begin Offset (FSBO), (iii) the Free Space End Offset (FSEO), (iv) the AVailable SPace in the block (AVSP), and the (v) Total SPace when all transactions are committed (TOSP).

Adjacent to the free-space section $431_{(i)}$ in block's data-layer are the rows $423_{(i)}, 423_{(i+1)} \ldots 423_{(n)}$. Included within each of the rows $423_{(i)}, 423_{(i+1)} \ldots 423_{(n)}$ is a corresponding row header. By way of example, row $423_{(n)}$ preferably contains row header $435_{(n)}$, and similar to the row-directory header $426_{(n)}$, the row header $435_{(n)}$ contains metadata for the row $423_{(n)}$. In the same way, the row header $435_{(n)}$ contains a status flag or row-status flag $437_{(n)}$. Again paralleling the row-directory header $426_{(n)}$, the row-status flag $437_{(n)}$ contains one or more indications, records, references, pointers, flags, and/or other notations that reflect the status of the user data carried within row $423_{(n)}$. These notations may include a bin number, a hex number, or some other notation.

When one of the rows $423_{(i)}, 423_{(i+1)} \ldots 423_{(n)}$ contains deleted user data, and such is denoted in the row-status flags of each of the corresponding block-header fields $426_{(i)}, 426_{(i+1)} \ldots 426_{(n)}$, the deleted row may be subsumed within the free-space section $431_{(i)}$. This allows the DBMS to overwrite the space originally allocated for the deleted row to store other rows. The sequence in which this deleted row is overwritten is controlled by the DBMS. Generally, the rows are overwritten in on a first-in-first-out basis; that is, the first row deleted is the row that is first overwritten.

C. Code for Data Recovery in Oracle Datafile Paradigm

The code 118 executable by the processor for carry out various functions described herein provide a mechanism for recovering deleted user data, even after the DBMS adds the deleted rows to the free-space partition, but before the rows are overwritten. The functions provided by code 118 include one or more machine or high-level instructions for (i) receiving one or more inputs that are indicative of the database datafile, (ii) ascertaining one or more addresses of the rows that have corresponding flags that indicate that the rows contain deleted user data, and (iii) altering one or more references in the block to remove these flags.

The code 118 for receiving at least one input indicative of the database datafile may include instructions that request the Oracle 8i system identification number, the database datafile block size, the schema objects of the database datafile, the table name and column, and/or other database datafile information. Using this information, the code 118 may include instructions to create a block-mask for determining the block that contains the deleted user data.

To perform the function of ascertaining one or more addresses of the rows that have corresponding flags that indicate that the rows contain deleted user data, the code 118 may include instructions for querying the data dictionary to locate the database segments, such as segment $417_{(i)}$, that correspond to the block-mask. The code 118 may include other instructions for uncovering the address of each of the extents $419_{(i)}, 419_{(i+1)} \ldots 419_{(n)}$, by querying the segment header of segment $417_{(i)}$. In turn, the code 118 may include instructions for querying the extent header for each of the extents $419_{(i)}, 419_{(i+1)} \ldots 419_{(n)}$. This query may yield the total number of blocks, and the addresses of each of the blocks contained within the extent queried. The code 118 may also include instructions for querying each of the blocks, such as blocks $423_{(i)}, 423_{(i+1)} \ldots 423_{(n)}$, using the block-mask to uncover the block or blocks matching the block-mask.

If, for example, block $423_{(i)}$ matches the block-mask, the code 118 for performing function of ascertaining one or more addresses of the rows that have corresponding flags that indicate that the rows contain deleted user data may further include instructions for querying the row directory $425_{(i)}$. More particularly, the code 118 may include instructions to query the row-directory-header field $426_{(i)}$ for the status flag $433_{(i)}$. If the row-directory-header field $426_{(i)}$ contains status flag $433_{(i)}$ that indicates the row $423_{(i)}$ contains deleted user data, and the row-directory-header field $426_{(i)}$ also contains the address of the row $423_{(i)}$, then the address of the row $423_{(i)}$ may be unmasked by querying row-directory-header field $426_{(i)}$ using an address mask. The address mask may be created by the code 118 using structure of the data-block $421_{(i)}$. Alternatively, the address mask may be predetermined. If the row-directory-header field $426_{(i)}$ contains the physical or intrinsic address of the row $423_{(i)}$, the code 118 may include instructions that use an address mask for recovering the physical or intrinsic addresses of the row $423_{(i)}$.

The function of ascertaining one or more addresses of the rows that have corresponding flags that indicate that the rows contain deleted user data, may be alternatively carried out with reference to the rows. Since each of the rows $423_{(i)}, 423_{(i+1)} \ldots 423_{(n)}$ may contain row-status flags, the code 118 may contain instructions for querying each of the row headers using a deleted-data-row mask for row status flags containing a notation that reflects deleted user data. Once uncovering one or more of the rows that contain the deleted-data-row mask, the address of such rows may be ascertained by using the corresponding row-directory-header fields. For example, included in row $423_{(i)}$ is row-header $435_{(i)}$, which carries status and address information for the user data stored in the data package $423_{(i)}$. The code 118 may include instructions to query the row header $435_{(i)}$ for the row-status flag $437_{(i)}$ that indicates that the user data contain within has been deleted. Using the results from the query of the row header $435_{(i)}$, and if the row-status flag $437_{(i)}$ indicates that the row $423_{(i)}$ contains deleted user data, the code 118 may include instructions for querying the corresponding row-directory header field, namely row-directory-header field $126_{(i)}$ for the physical or intrinsic address of the row $423_{(i)}$.

In performing the function of altering one or more references in the block to remove the flags that indicate that the rows contains deleted user data, the code 118 may include instructions for removing the deleted user data notation carried in the status flags, and/or the row-status flags. This may be provided by modifying or extracting the deleted user data notation so that the status flags, and/or the row-status flags no longer reflect the user data as deleted.

As an example, the code 118 may include instructions directing the processor 110 to load the row-directory-header field $426_{(i)}$ and/or the row header $435_{(i)}$ into a ninth virtual workspace. Other instructions in the code 118 may direct the processor to change the values or notations of the status flag $433_{(i)}$, and the row-status flag $437_{(i)}$, so that the user data is no longer reflected as deleted. When executing this function, the code 118 may direct the processor 110 to load the row-directory-header field $426_{(i)}$ and the row header $435_{(i)}$ all at one or one at a time.

The code 118 may optionally provide instructions for searching the database datafile for one or more flags indicative of deleted user data. Preferably, the code 118 furnishes instructions for searching the database datafile for the status flag $423_{(i)}$, and the row-status flag $423_{(i)}$ that have notations indicating that the database datafile contains deleted user data.

To perform the search, the code 118 may cause the processor to load one of the blocks into tenth virtual workspace, and then to search on a byte-by-byte basis for notation or values representing deleted user data in the status flag $423_{(i)}$, and/or the row-status flag $423_{(i)}$.

The code 118 may furnish other instructions for (i) altering the block's free-space partition after recovering deleted user data to remove from the free space the rows formerly designated as containing deleted user data, (ii) recording one or more addresses of rows containing flags that indicate that the rows contain deleted user data, (iii) converting from machine readable code to human readable code the contents of the rows containing the flags that indicate that the rows contain deleted user data, (iv) displaying the human readable code of the rows containing the flags that indicate that the rows contain deleted user data, (v) receiving one or more inputs indicative of the human readable code, and (vi) ascertaining one or more addresses of the rows corresponding to the inputs indicative of the human readable code.

As noted, incorporated in the code 118 are instructions for altering the block's free-space partition after recovering deleted user data to remove from the free space the rows formerly designated as containing deleted user data. These instructions may provide for altering the pointers held within the transaction layer of block $421_{(i)}$ that correspond to free space partition $431_{(i)}$. To facilitate removing the rows designated at free space in which the user data has been recovered ("recovered rows"), the code 118 may provide instructions for modifying space allocated in the free-space partition $431_{(i)}$ for the recovered rows. This modification may be facilitated by modifying the values of the FRRE, FSBO, FSEO, AVSP and TOSP pointers, so as to subtract the space allocated to the recovered row from the free space section $431_{(i)}$. Thereafter, the free space section $431_{(i)}$ excludes the recovered rows from its free space.

The code 118 may also furnish instructions to record one or more addresses of rows containing flags that indicate that the rows contain deleted user data. This may be carried out by storing and/or cataloging the addresses of the rows that contain deleted user data in an address-log file on the data-storage 112, which may aid in carrying out the function of ascertaining the addresses of each of the rows that contain deleted user data. The code 118 may also furnish instructions for creating an interface that displays the contents of the cataloged addresses, so that a user or operator may select the rows of deleted user data to recover. In building the interface and display, the code 118 may provide instructions for converting the contents of the cataloged rows from machine-readable code to human readable code, and to display the human readable code to the user or operator. In displaying the human readable code to the user or operator, the code 118 may port the information to a monitor, printout, or any other display device.

For the user or operator to select the rows of deleted user data to recover, the code 118 provides instructions for receiving one or more inputs indicative of the human readable code. These inputs preferably reflect the user or operator selection of the displayed human readable code, which in turn reflect the corresponding addresses of rows containing deleted user data. These inputs are also preferably inputted from a keyboard or other input device connected the port of the processor 110.

Using the inputs that reflect the user or operator selection, the code 118 may incorporate instructions for receiving the ascertaining one or more addresses of the rows corresponding to the user or operator selection. These instructions provide for matching the user or operator selection with the one or more corresponding addresses in the address-log file. Using the resultant addresses from the matching operation, the code 118 may furnish instructions that locate and modify the block, as previously described, to recover the user data.

5. Functions for Data Recovery in Oracle Datafile Paradigm

Figure 5:
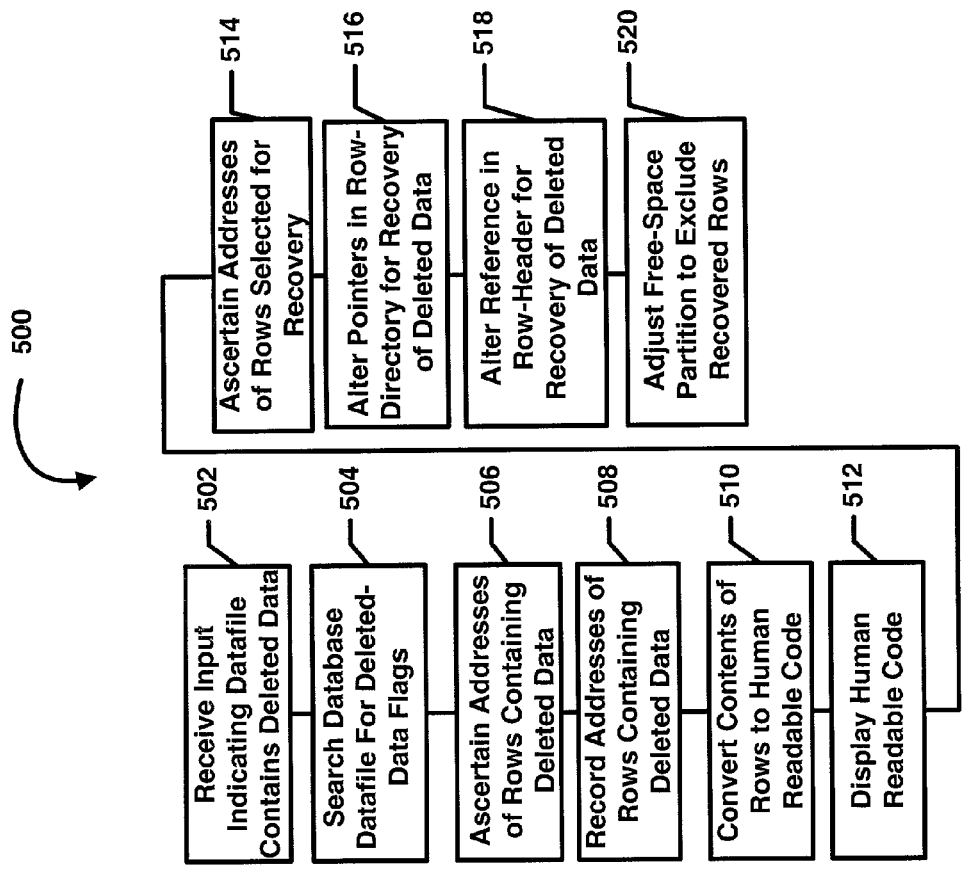
FIG. 5 is a second flow chart further illustrating the functions used for accomplishing data recovery in accordance with one of the exemplary embodiments.

Referring now to FIG. 5, a flow chart 500 is provided for further illustrating the functions used to accomplish recovery of deleted user data within a database datafile in accordance with an exemplary embodiment. The exemplary embodiment illustrated in FIG. 5 is described with reference to FIG. 4, in which row $423_{(i)}$ contains deleted user data. It should be understood that the particular order of functions as set forth and described herein can vary from that presented.

A. Receive Datafile Descriptors

At box 502, the processor 110 receives one or more inputs that indicate that the database datafile 410 contains deleted user data. These inputs may include the Oracle 8i system identification number, the database-datafile-block size, the schema objects of the database datafile, the table name and column and/or other database datafile information. This information may be used to create a block-mask for determining which block contains the deleted user data.

B. Search for Deleted Data

At box 504, the processor 110 performs the function of searching the database datafile 410 for one or more flags indicative of deleted user data ("deleted-data flags"). Preferably, the processor 110 performs the function by searching through the blocks $421_{(i)}, 421_{(i+1)} \ldots 421_{(n)}$ to locate the status flag indicating that the block $421_{(i)}$ contains deleted user data, as may be indicated by status flag $433_{(i)}$. The processor 110 also preferably searches the each of the rows $423_{(i)}, 423_{(i+1)} \ldots 423_{(n)}$ to locate the row-status flag $431_{(i)}$ indicating that rows $423_{(i)}$ contain deleted user data.

In performing the search, the processor 110 may load one of the blocks, such as $421_{(i)}, 421_{(i+1)} \ldots 421_{(n)}$ into twelfth virtual workspace (that is cached into the data-storage 112 at periodic intervals), and then perform a byte-by-byte search for the notation representing deleted user data in the status flag $433_{(i)}$. The processor 110 may also perform a byte-by-byte search for the notation representing deleted user data in the row-status flag $437_{(i)}$. Preferably, the processor 110 searches block $421_{(i)}$ for the notation representing deleted user data in both the status flag $433_{(i)}$, and the row-status flag $437_{(i)}$.

C. Ascertain Rows' Addresses

At box 506, the function of ascertaining one or more addresses of the rows that have corresponding deleted-data flags, may be carried out using the block-mask that is created from the inputs received by the processor 110, as indicated box 502. Using the block-mask, this function may be provided by querying the data dictionary to locate the database segments, such as segment $417_{(i)}$. Then, after uncovering segment $417_{(i)}$, the address of extents, such as extents $419_{(i)}, 419_{(i+1)} \ldots 419_{(n)}$, may be determined by querying the segment header of segment $417_{(i)}$. The query of the segment header may provide the address for each of the extents $419_{(i)}, 419_{(i+1)} \ldots 419_{(n)}$. In turn, the processor 110 queries the extent header for each of the extents $419_{(i)}$, $419_{(i+1)} \ldots 419_{(n)}$ to yield the total number of blocks per extent, and the addresses of each of the blocks contained within the queried extent. Then, by querying each of the blocks, such as blocks $423_{(i)}$, $423_{(i+1)} \ldots 423_{(n)}$ using the block-mask, the block matching the block-mask may be uncovered.

If, for example, block $423_{(i)}$ matches the block-mask, the function of ascertaining one or more addresses of the rows that have corresponding deleted-data flags may be performed by querying the row directory $425_{(i)}$, and in turn querying the row-directory-header field $426_{(i)}$ for the status flag $433_{(i)}$. If the row-directory-header field $426_{(i)}$ contains status flag $433_{(i)}$ that indicates the row $423_{(i)}$ contains deleted user data, then the address of the row $423_{(i)}$ may be unmasked by querying row-directory-header field $426_{(i)}$ using an address mask. If the row-directory-header field $426_{(i)}$ contains the physical or intrinsic address of the row $423_{(i)}$, then by applying an address mask for unmasking the physical or intrinsic address of the row $423_{(i)}$ the physical or intrinsic address of the row $423_{(i)}$ may be uncovered.

D. Record Rows' Addresses

Next, at box 508, processor 110 may perform the function of recording one or more addresses of rows that have corresponding deleted-data flags. This function may be carried out by storing or cataloging the addresses of one or more the rows that contain deleted user data in an address-log file. Later, the processor 110 may query the address-log file for the addresses of the rows that have corresponding deleted data flags to build an interface for displaying the rows' contents.

E. Convert Rows'Contents and Build Interface

To build this interface and display the contents of the rows that contain deleted user data, the processor 110 converts the contents of the rows that have corresponding deleted-data flags from machine readable code to human readable code, as shown in box 510. In box 512, the processor 110 displays the human readable code.

F. Ascertain Addresses of Rows Selected for Recovery

To ascertain one or more of the addresses of the rows selected for recovery, a user or operator, via a keyboard and monitor connected the port of the processor 110, selects and inputs information indicative of the rows that contain deleted user data from the human readable code, as shown in box 514. These inputs reflect one or more of the addresses of the rows that have corresponding deleted-data flags.

G. Alter Pointers in Row-Directory

In addition to ascertaining the addresses of one or more of the rows selected by the user or operator, as denoted in box 516, the processor 110 may perform the function of altering one or more pointers within the row directory by altering the status flags in the row directory $425_{(i)}$ for each of the selected rows. As one example of the function of altering the status flags, the processor 110 may load block $421_{(i)}$ into a thirteenth virtual workspace, which is cached into the data-storage 112 at periodic intervals. The processor 110 then locates status flag $433_{(i)}$ in the row-directory header field $426_{(i)}$. After locating the status flag $433_{(i)}$, the processor 110 then modifies the notations or values contained within the row-directory header field $426_{(i)}$ so that the user data is no longer reflected as deleted, and thus, the user data may be recovered.

H. Alter References in Row-Header

As denoted in box 518, the processor 110 performs the function of altering one or more references in the row headers to recover deleted user data by altering the row-status flags for each of the selected rows. Paralleling the process of altering the status flag $433_{(i)}$ in the row-directory header field $426_{(i)}$, altering the row-status flag may be accomplished by first the loading the block $421_{(i)}$ into the thirteenth virtual workspace, which again is cached into the data-storage 112 at periodic intervals. Next, the processor 110 locates the row-status flag $437_{(i)}$ in the row header $431_{(i)}$. Once located, the processor 110 modifies the notations or values contained within the row-status flag $437_{(i)}$ to stop reflecting the user data as deleted, and thus, the user data may be recovered.

I. Adjust Free Space Partition

As denoted in box 520, the processor 110 performs the function of altering the free-space partition, such as free-space partition $431_{(i)}$, by altering the pointers contained within the block's transaction layer. Which means that after altering the status flags and/or the row-status flags so that they no longer contain notations that indicate that the corresponding rows contain deleted user data, the processor 110 may remove from the free-space partition $431_{(i)}$ the space consumed by the rows in which the user data has been recovered ("recovered rows"). In doing so, the processor 110 may subtract the space allocated to the recovered rows in the free space partition $431_{(i)}$ by modifying the values of the FRRE, FSBO, FSEO, AVSP and TOSP pointers. After modifying the FRRE, FSBO, FSEO, AVSP and TOSP pointers, the free space partition $431_{(i)}$excludes the space consumed by the recovered rows, which means the DBMS may recognize the recovered user data, and accordingly not overwrite it.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

What is claimed is:

1. A system comprising:
   a computing platform comprising:
      at least one processor; and
      data storage having stored thereon program instructions that are executable by the at least one processor for executing an operating system, a file management system, and a database management system;
   a database datafile defined by the database management system and stored on the data storage, the database datafile comprising at least one flag indicative of deleted data, the at least one flag being defined by the database management system; and
   program instructions executable by the at least one processor to:
   (i) receive at least one input indicative of the database datafile for locating via the file management system the database datafile on the data storage;

(ii) ascertain from the database datafile at least one address of deleted data, the at least one address of deleted data corresponding to the at least one flag; and (iii) alter in the database datafile at least one reference corresponding to the at least one address of deleted data, to clear the at least one flag indicative of deleted data from the database datafile and produce at least one recovered-data address, whereby after the at least one flag is cleared, the processor running the database management system has access to the at least one recovered-data address and thus has access to the deleted data.

2. The system of claim 1, further including program instructions executable by the at least processor to search the database datafile for the at least one flag.

3. The system of claim 2, wherein the at least one database datafile comprises at least one block, and wherein the program instructions to search the database datafile include at least one program instruction to search the at least one block for the at least one flag.

4. The system of claim 3, wherein each of the at least one block comprises at least one header field, and wherein the program instructions to search the database datafile include at least one program instruction to search the at least one header field for the at least one flag.

5. The system of claim 3, wherein each of the at least one block comprises a data directory, and wherein the program instructions to search the database datafile include at least one program instruction to search the data directory for the at least one flag.

6. The system of claim 3, wherein each of the at least one block comprises at least one data package, and wherein the program instructions to search the database datafile include at least one program instruction to search the data package for the at least one flag.

7. The system of claim 3, wherein the at least one block further comprises at least one header field, and wherein the program instructions to alter the at least one reference include at least one program instruction to alter the at least one reference in the at least one header field.

8. The system of claim 3, wherein the at least one block further comprises a data directory, and wherein the program instructions to alter the at least one reference include at least one program instruction to alter the at least one reference in the data directory.

9. The system of claim 4, wherein the at least one block further comprises at least one data package, and wherein the program instructions to alter the at least one reference include at least one program instruction to alter the at least one reference in the data package.

10. The system of claim 1, wherein the at least one database datafile comprises at least one block, and wherein the program instructions to alter the at least one reference include at least one program instruction to alter the at least one reference in the at least one block.

11. The system of claim 10, wherein each of the at least one block comprises at least one header field, and wherein the program instructions to alter the at least one reference include at least one program instruction to alter the at least one reference in the at least one header field.

12. The system of claim 10, wherein each of the at least one block comprises a data directory, and wherein the program instructions to alter the at least one reference include at least one program instruction to alter the at least one reference in the data directory.

13. The system of claim 10, wherein each of the at least one block comprises at least one data package, and wherein the program instructions to alter the at least one reference include at least one program instruction to alter the at least one reference in the at least one data package.

14. A system comprising:
a computing platform comprising:
at least one processor; and
data storage having stored thereon program instructions that are executable by the at least one processor for executing an operating system, a file management system, and a database management system;
a database datafile defined by the database management system and stored on the data storage, the database datafile defining a data block, the data block comprising a row directory and at least one row containing deleted data, the row directory having a first flag indicative of deleted data for each of the at least one row containing deleted data, the first flag being defined by the database management system; and
program instructions executable by the at least one processor to:
(i) receive at least one input indicative of the database datafile for locating via the file management system the database datafile on the data storage;
(ii) search the row directory for the first flag indicative of deleted data; and
(iii) alter the row directory to clear the first flag indicative of deleted data for each of the at least one row, whereby the processor running the database management system has access to the at least one row containing deleted data and thus has access to the deleted data.

15. The system of claim 14, wherein each of the at least one row containing deleted data defines a second flag indicative of deleted data and a corresponding deleted-data address, wherein the row directory defines at least one pointer pointing to the corresponding deleted data address of each of the at least one row containing deleted data, and further including program instructions to:
(i) ascertain from the row directory the at least one pointer pointing to the corresponding deleted data address of each of the at least one row;
(ii) locate each of the at least one row using the corresponding at least one pointer; and
(iii) alter each of the at least one row to clear the second flag indicative of deleted data, and to transform the at least one row of deleted data into corresponding recovered-data rows, whereby the processor running the database management system has access to the corresponding recovered-data rows.

16. The system of claim 14, wherein the data block further comprises a free space partition, wherein each of the at least one row containing deleted data is contained within the free space partition, and further including program instructions to alter the free space partition, wherein, when executed by the processor, the program instructions alter the free space partition so as to remove each of the at least one row containing deleted data from the free space partition.

17. The system of claim 14, wherein the data block further comprises a plurality header fields, wherein the plurality of header fields comprises a first free row index pointer, a free space begin offset pointer, a free space end offset pointer, an available space pointer and a total space pointer, and wherein the program instructions to alter the free space partition include at least one instruction to modify the first free row index pointer, the free space begin offset pointer, the free space end offset pointer, the available space pointer, and/or the total space pointer so as to exclude each of the at least one row containing deleted data.

18. A system comprising:
a computing platform comprising:
at least one processor; and
data storage having stored thereon program instructions that are executable by the at least one processor for executing an operating system, a file management system, and a database management system;
a database datafile defined by the database management system and stored on the data storage, the database datafile defining a data block, the data block comprising at least one row containing deleted data, each of the at least one row containing deleted data having a first flag indicative of deleted data, the first flag being defined by the database management system; and
program instructions executable by the at least one processor to:
(i) receive at least one input indicative of the database datafile for locating via the file management system the database datafile on the data storage;
(ii) search each of the at least one row for the first flag indicative of deleted data; and
(iii) alter each of the at least one row to clear the first flag indicative of deleted data, and to transform each of the at least one row into a corresponding recovered-data row, whereby the processor running the database management system has access to each of the corresponding recovered-data row and thus has access to the deleted data.

19. The system of claim 18, wherein the block further comprises a row directory, the row directory comprising a second flag indicative of deleted data for each of the at least one row containing deleted data, the second flag being defined by the database management system, and further including program instructions to:
(i) ascertain from the row directory the second flag of each of the at least one row containing deleted data; and
(ii) alter the row directory to clear the second flag indicative of deleted data for each of the at least one row containing deleted data, whereby the processor running the database management system has access to the at least one row containing deleted data.

20. A system comprising:
a computing platform comprising:
at least one processor; and
data storage having stored thereon program instructions that are executable by the at least one processor for executing an operating system, a file management system, and a database management system;
a database datafile defined by the database management system and stored on the data storage, the database datafile comprising a block, the block comprising a row directory and at least one row containing deleted data, the row directory comprising a first flag indicative of deleted data for each of the at least one row containing deleted data, the first flag being defined by the database management system, the row directory further comprising at least one pointer pointing to the corresponding deleted data address of each at least one row containing deleted data, each of the at least one row containing deleted data comprising a second flag indicative of deleted data and a corresponding deleted-data address, the second flag being defined by the database management system and further including program instructions to:
(i) receive at least one input indicative of the database datafile for locating via the file management system the database datafile on the data storage;
(ii) search the row directory for the first flag indicative of deleted data;
(iii) record the at least one pointer for each of the at least one row containing deleted data;
(iv) locate each of the at least one row using the at least one pointer;
(v) convert each of the at least one row containing the deleted data from machine readable code to human readable code;
(vi) display the human readable code of each of the at least one row containing the deleted data;
(vii) receive at least one second input indicative of the display of the human readable code;
(viii) alter in the row directory the first flag for each of the at least one row corresponding to the at least one second input so as to clear the first flag; and
(ix) alter in the at least one row the second flag for each of the at least one row corresponding to the at least one second input to clear the second flag, and to transform each of the at least one row corresponding to the at least one second input into a recovered-data row, whereby the processor running the database management system has access to each of the recovered-data row and thus has access to the deleted data.

21. In a system comprising a computing platform that includes (i) at least one processor and (ii) a data storage having stored thereon program instructions that are executable by the at least one processor for executing an operating system, a file management system, and a database management system, a method of recovering deleted data from a database datafile, the database datafile being defined by the database management system and stored on the data storage, the database datafile comprising at least one flag indicative of deleted data, the method comprising:
receiving at least one input indicative of the database datafile for locating via the file management system the database datafile defining at least one flag;
ascertaining from the database datafile at least one address of deleted data corresponding to the at least one flag; and
altering in the database datafile at least one reference corresponding to the at least one address of deleted data to clear the at least one flag indicative of deleted data, and to produce at least one recovered-data address, whereby after the at least one flag is cleared, the database management system has access to the at least one recovered-data address and thus has access to the deleted data.

22. The method of claim 21, further comprising searching the database datafile for the at least one flag.

23. The method of claim 22, wherein the at least on database datafile comprises at least one block, and wherein searching the database datafile includes searching the at least one block for the at least one flag.

24. The method of claim 22, wherein each of the at least one block comprises at least one header field, and wherein searching the database datafile includes searching the at least one header field for the at least one flag.

25. The method of claim 22, wherein each of the at least one block comprises a data directory, and wherein searching the database datafile includes searching the data directory for the at least one flag.

26. The method of claim 22, wherein each of the at least one block comprises at least one data package, and wherein searching the database datafile includes searching the data package for the at least one flag.

27. The method of claim 22, wherein the at least one block further comprises at least one header field, and wherein altering the at least one reference includes altering the at least one reference in the at least one header field.

28. The method of claim 22, wherein the at least one block further comprises a data directory, and wherein altering the at least one reference includes altering the at least one reference in the data directory.

29. The method of claim 23, wherein the at least one block further comprises at least one data package, and wherein altering the at least one reference includes altering the at least one reference in the data package.

30. The method of claim 21, wherein the at least one database datafile comprises at least one block, and wherein altering the at least one reference includes altering the at least one reference in the at least one block.

31. The method of claim 30, wherein the at least one block comprises at least one header field, and wherein altering the at least one reference includes altering the at least one reference in the at least one header field.

32. The method of claim 30, wherein the at least one database datafile comprises a data directory, and wherein altering the at least one reference includes altering the at least one reference in the data directory.

33. The method of claim 30, wherein each of the at least one block comprises at least one data package, and wherein altering the at least one reference includes altering the at least one reference in the at least one data package.

34. In a system comprising a computing platform that includes (i) at least one processor and (ii) a data storage having stored thereon program instructions that are executable by the at least one processor for executing an operating system, a file management system, and a database management system, a method of recovering deleted user data from a database datafile stored on a data storage, wherein the database datafile comprises a data block, wherein the data block comprises a row directory and at least one row containing deleted data, wherein the row directory has a first flag indicative of deleted data for each of the at least one row containing deleted data, and wherein the first flag is defined by the database management system, the method comprising:
    receiving at least one input indicative of the database datafile for locating via the file management system, the database datafile on the data storage;
    searching the row directory for at least one first flag indicative of deleted data; and
    altering the row directory so as to clear the first flag indicative of deleted data for each of the at least one row containing deleted data, whereby the database management system has access to the at least one row containing deleted data and thus has access to the deleted data.

35. The method of claim 34, wherein each of the at least one row containing deleted data comprises a second flag indicative of deleted data and comprises a corresponding deleted-data address, wherein the second flag is defined by the database management system, and wherein the row directory comprises at least one pointer pointing to the corresponding deleted data address of each of the at least one row containing deleted data, the method further comprising:
    ascertaining from the row directory the at least one pointer pointing to the corresponding deleted data address of each of the at least one row having the first flag;
    locating the at least one row using the at least one pointer; and
    altering the at least one row to clear the second flag indicative of deleted data for each of the at least one row containing deleted data, and to transform the at least one row of deleted data into corresponding recovered-data rows, whereby the processor running the database management system has access to the corresponding recovered-data rows.

36. The method of claim 34, wherein the data block further comprises a free space partition, wherein each of the at least one row containing deleted data is contained within the free space partition, the method further comprising:
    altering the free space partition so as to remove each of the at least one row containing deleted data from the free space partition.

37. The method of claim 34, wherein the data block further comprises a plurality header fields for managing the free space partition, and wherein the plurality of header fields comprises a first free row index pointer, a free space begin offset pointer, a free space end offset pointer, an available space pointer and a total space pointer, the method further comprising:
    altering the first free row index pointer,
    altering the free space begin offset pointer,
    altering the free space end offset pointer,
    altering the available space pointer, and/or
    altering total space pointer so as to remove each of the at least one row containing deleted data from the free space partition.

38. In a system comprising a computing platform that includes (i) at least one processor and (ii) a data storage data storage having stored thereon program instructions that are executable by the at least one processor for executing an operating system, a file management system, and a database management system, a method of recovering deleted data from a database datafile stored on the a data storage, wherein the database datafile comprises a data block, wherein the data block comprises at least one row containing deleted data, wherein each of the at least one row containing deleted data as a first flag indicative of deleted data, and wherein the first flag is defined by the database management system, the method comprising:
    receiving at least one input indicative of the database datafile for locating via the file management system, the database datafile on the data storage;
    searching each of the at least one row for the first flag indicative of deleted data; and
    altering each of the at least one row to clear the first flag indicative of deleted data, and to transform each of the at least one row into a corresponding recovered-data row, whereby the processor running the database management system has access to each of the corresponding recovered-data row and thus has access to the deleted data.

39. The method of claim 38, wherein the data block further comprises a row directory, wherein the row directory comprises a second flag indicative of deleted data for each of the at least one row containing deleted data, and wherein the second flag is defined by the database management system, the method further comprising:
    ascertaining from the row directory the second flag of each of the at least one row containing deleted data; and
    altering the row directory to clear the second flag indicative of deleted data for each of the at least one row containing deleted data, whereby the database management system has access to the at least one row containing deleted data.

40. In a system comprising a computing platform that includes (i) at least one processor and (ii) a data storage having stored thereon program instructions that are executable by the at least one processor for executing an operating system, a file management system, and a database management system, a method of recovering deleted data from a database datafile stored on the a data storage, wherein the database datafile comprises a data block, wherein the data block comprises a row directory and at least one row containing deleted data, wherein the row directory comprises a first flag indicative of deleted data for each of the at least one row containing deleted data, wherein the first flag is defined by the database management system, wherein the row directory further comprises at least one pointer pointing to the corresponding deleted data address of each at least one row containing deleted data, wherein each of the at least one row contains deleted data comprising a second flag indicative of deleted data and a corresponding deleted-data address, and wherein the second flag is defined by the database management system, the method comprising:

receiving at least one input indicative of the database datafile for locating via the file management system the database datafile on the data storage;

searching the row directory for the first flag indicative of deleted data;

recording the at least one pointer for each of the at least one row containing deleted data;

locating each of the at least one row using the at least one pointer;

converting each of the at least one row containing the deleted data from machine readable code to human readable code;

displaying the human readable code of each of the at least one row containing the deleted data;

receiving at least one second input indicative of the display of the human readable code;

altering in the row directory the first flag for each of the at least one row corresponding to the second input so as to clear the first flag; and to transform each of the at least one row corresponding to the at least one second input into a recovered-data row, whereby the database management system has access to each of the recovered-data row and thus has access to the deleted data.

* * * * *